(12) United States Patent  (10) Patent No.: US 8,764,186 B2
Nolan  (45) Date of Patent: Jul. 1, 2014

(54) PROTECTIVE EYEWEAR SYSTEMS AND METHODS FOR VISION ENHANCEMENTS

(75) Inventor: William H. Nolan, Lakewood, CO (US)

(73) Assignee: HaberVision LLC, Golden, CO (US)

( * ) Notice: Subject to any disclaimer, the term of this patent is extended or adjusted under 35 U.S.C. 154(b) by 259 days.

(21) Appl. No.: 13/250,402

(22) Filed: Sep. 30, 2011

(65) Prior Publication Data

US 2012/0081655 A1    Apr. 5, 2012

Related U.S. Application Data

(60) Provisional application No. 61/389,096, filed on Oct. 1, 2010.

(51) Int. Cl.
*G02C 7/06* (2006.01)

(52) U.S. Cl.
CPC . *G02C 7/06* (2013.01); *G02C 7/066* (2013.01)
USPC .................. 351/159.41; 351/55; 351/159.48

(58) Field of Classification Search
CPC .......... G02C 7/06; G02C 7/061; G02C 7/066
USPC ............... 351/41, 44, 54, 55, 159.01, 159.41, 351/15.43, 159.47, 159.48, 159.49, 159.43
See application file for complete search history.

(56) References Cited

U.S. PATENT DOCUMENTS

| 3,533,686 | A | 10/1970 | O'Shea | |
|---|---|---|---|---|
| 4,455,688 | A | 6/1984 | Poe | |
| 5,095,551 | A | 3/1992 | Chin | |
| 5,162,828 | A | 11/1992 | Furness et al. | |
| 5,177,817 | A | 1/1993 | Kamata | |
| 5,410,763 | A | 5/1995 | Bollé | |
| 5,682,621 | A | 11/1997 | Park | |
| 5,711,035 | A * | 1/1998 | Haslbeck | 2/436 |
| 6,027,214 | A * | 2/2000 | Graham | 351/57 |
| 6,711,753 | B2 | 3/2004 | Arai | |
| 7,376,981 | B2 | 5/2008 | Shida | |
| 7,866,812 | B1 | 1/2011 | Tullis | |
| 2006/0156457 | A1 | 7/2006 | Penque, Jr. et al. | |
| 2007/0089215 | A1 | 4/2007 | Biche et al. | |
| 2007/0121058 | A1* | 5/2007 | Chuang | 351/54 |
| 2007/0195263 | A1* | 8/2007 | Shimizu et al. | 351/168 |
| 2007/0279577 | A1* | 12/2007 | Stanley et al. | 351/62 |

OTHER PUBLICATIONS

International Search Report of PCT/US2011/054156 mailed on Jan. 23, 2012, 2 pages.

* cited by examiner

*Primary Examiner* — Huy K Mai

(74) *Attorney, Agent, or Firm* — Kilpatrick Townsend & Stockton LLP

(57) ABSTRACT

Protective eyewear systems providing vision enhancement to a user include a wrap-around lens or eyeshield having a first region with a first optical power and a second region with a second optical power different from the first optical power. Exemplary eyewear systems and methods of their manufacture involve coupling or integrating wrap-around lenses or eyeshield with ski goggles, motorcycle helmets, and other types of headgear.

16 Claims, 23 Drawing Sheets

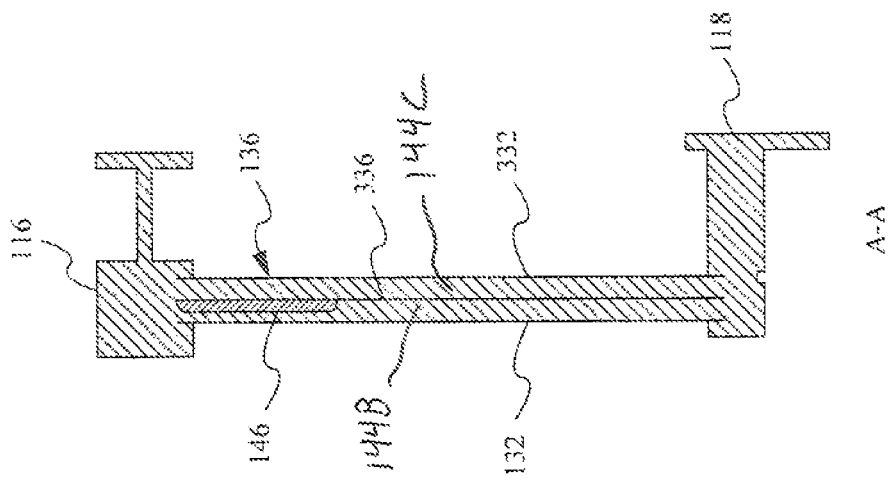
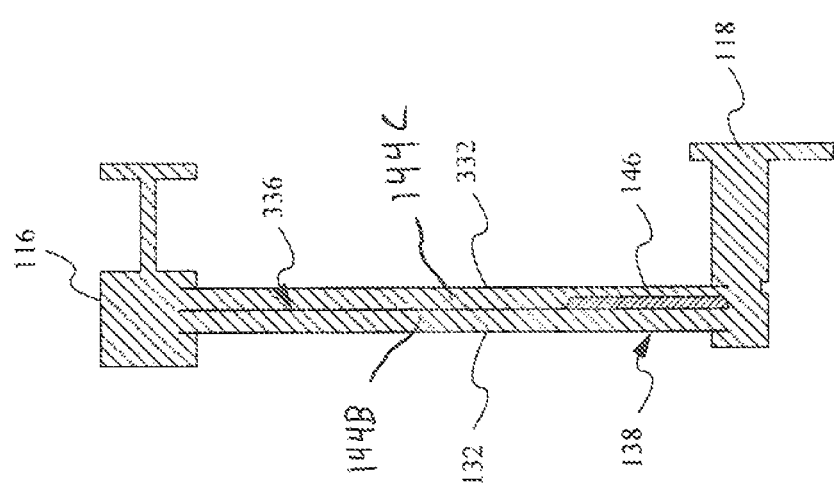

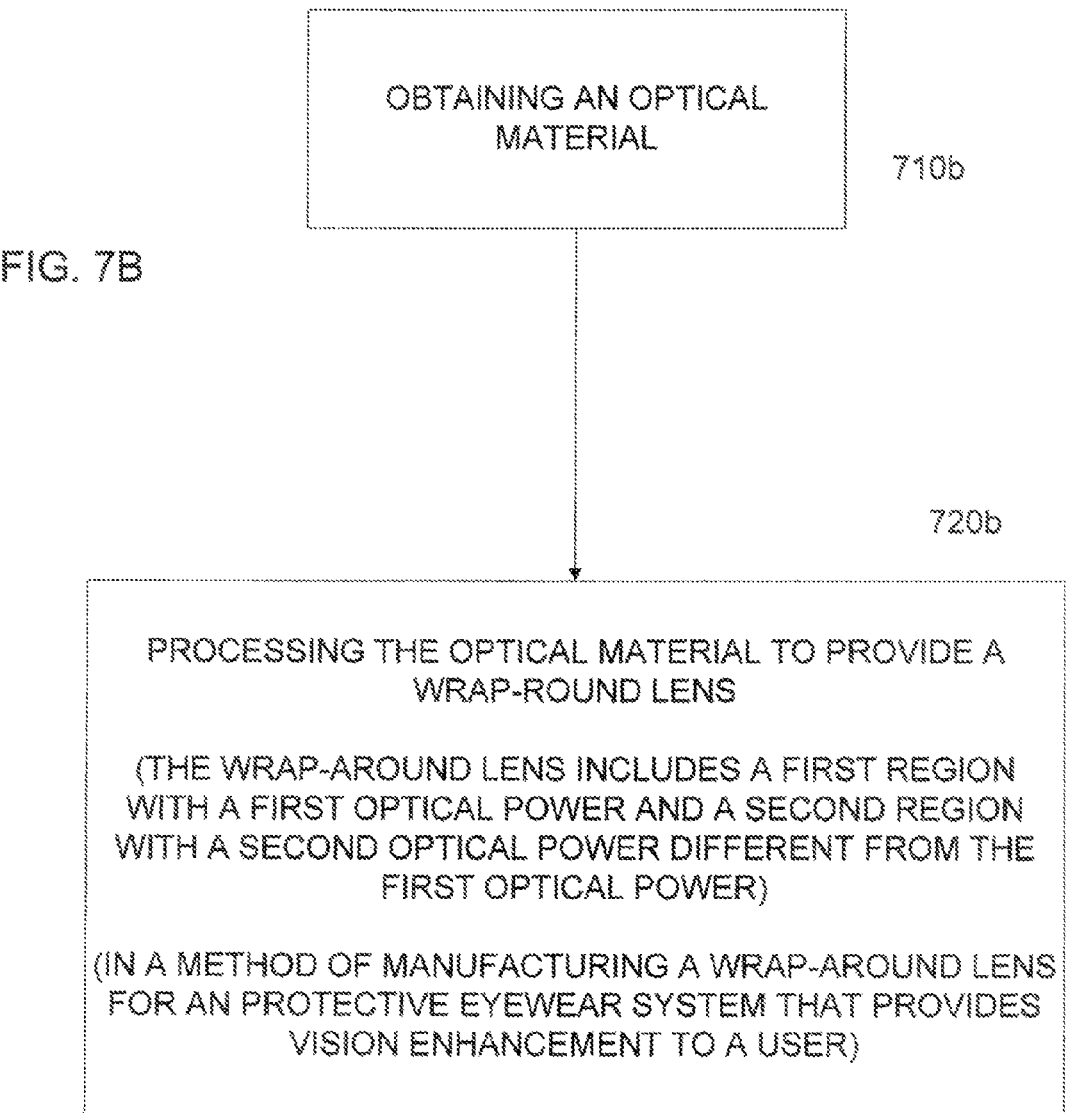

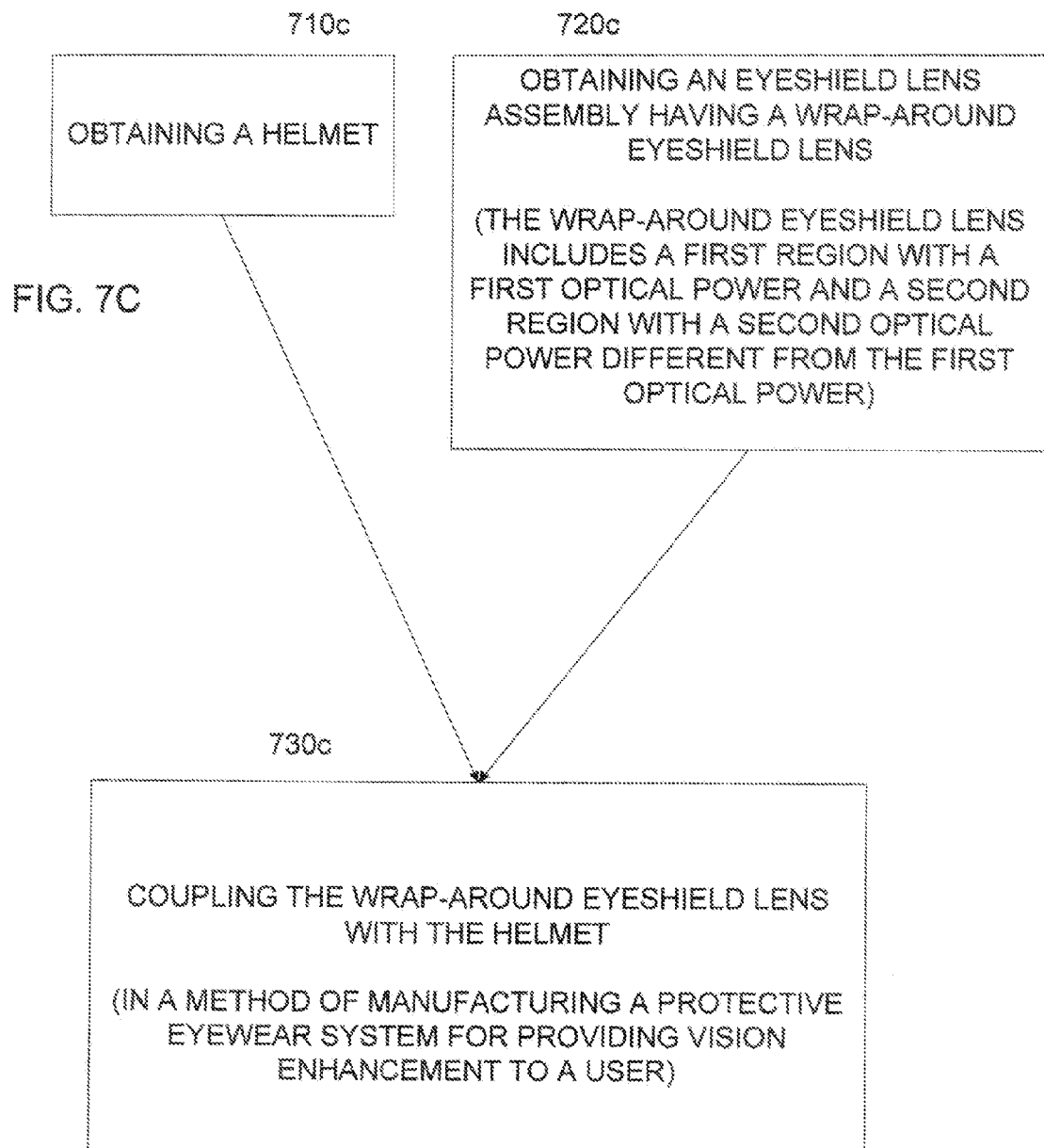

PROTECTIVE EYEWEAR SYSTEMS AND METHODS FOR VISION ENHANCEMENTS

CROSS-REFERENCES TO RELATED APPLICATIONS

This application is a nonprovisional of, and claims the benefit of priority to, U.S. Provisional Patent Application No. 61/389,096 filed Oct. 1, 2010, the entire disclosure of which is incorporated herein by reference herein for all purposes.

BACKGROUND OF THE INVENTION

Embodiments of the present invention related generally to the field of protective eyewear, and in particular to systems and methods involving protective eyewear for enhancing vision for an individual person.

Although protective eyewear devices are currently available and provide real benefits to a wide variety of users, many advances may still be made to provide improved devices to persons who wear such devices. Embodiments of the present invention provide solutions to these outstanding needs.

BRIEF SUMMARY OF THE INVENTION

Embodiments of the present invention encompass protective eyewear systems, and methods of their manufacture, which provide vision enhancement for individual users. Such systems may include goggles, helmets, visors, and other headgear for various applications, including sports such as skiing and motorcycling, police, safety, and the military. Exemplary protective eyewear systems may include molded or cast lens elements, optionally provided in cylindrical or spherical shapes, that are attached with or integral to a wrap-around lens or eyeshield. Typically, such wrap-around lenses or eyeshields provide additional protection for the user's eyes from wind, sun, debris, and impact, and cover a significant portion of the user's field of view as a single prescribed area. Hence, the wrap-around lenses or eyeshields can be used for goggles, helmets, and the like, such that the lens or eyeshield is configured for placement along the visual axes of both right and left eyes of the user. In this sense, these lenses or eyeshields are distinct from spectacles or the like which provide separated viewing elements for each eye. In some cases, a refractive or lens element may provide a bi-focal or multi-focal vision enhancement for the user. In some embodiments, the terms wrap-around lens and eyeshield may be used interchangeably. Systems and devices disclosed herein may be particularly suitable for individuals who need or desire enhanced vision capabilities, for example persons who exhibit presbyopia, myopia, or hyperopia. Similarly, persons who do not present with a vision condition, but otherwise need or desire enhanced vision capabilities for performing or carrying out certain tasks, which may involve reading fine print or viewing small objects while wearing goggles or a helmet for example, will find benefit from using the systems and devices disclosed herein.

In some instances, protective eyewear systems may include a molded or cast cylindrical or spherical lens that includes a fixed power bi-focal refractive element or portion. Exemplary protective eyewear systems may include one or more lens blanks which provide various optical powers, for example to accommodate a user's prescriptive needs. As further described herein, embodiments encompass protective eyewear systems having a single wrap around lens or eyeshield that includes one or more refractive or corrective elements. In some cases, wrap-around lenses or eyeshields contain two refractive or corrective elements, where a first element is configured for use with the user's right eye, and a second element is configured for use with the user's left eye.

As disclosed elsewhere herein, embodiments encompass methods of manufacturing protective eyewear lenses, eyeshields, goggles, helmets, and the like. For example, manufacturing methods may include producing or obtaining a blank, which may be cast, molded, or extruded so as to present a curved shape. In some cases, the blank may be provided in a rectangular sheet form. The blank can be edged or cut into shapes suitable for use with a particular goggle or helmet design. Some protective eyewear systems may include two lenses or eyeshields that form a dual-layer assembly. In such cases, a bi-focal or multi focal refractive element can be located in or attached with either of the inner or outer lenses, or otherwise disposed between the inner and outer lenses.

In one aspect, embodiments of the present invention encompass a protective eyewear system for providing vision enhancement to a user. A protective eyewear system can include a frame, and a lens assembly having a wrap-around lens. The wrap-around lens can be coupled with the frame. The wrap-around lens can include a first region with a first optical power and a second region with a second optical power different from the first optical power. In some cases, the lens assembly includes a refractive element attached with the wrap-around lens, and the refractive element at least partially contributes to the second optical power of the second region. In some cases, the second optical power is configured to provide enhanced near vision for the user. In some cases, the first optical power is 0 Diopters and the second optical power is 2.25 Diopters. In some cases, the wrap-around lens is at least partially encircled by the frame. In some cases, the wrap-around lens is fully encircled by the frame. In some cases, the lens assembly further includes a second wrap-around lens. According to some embodiments, the lens assembly further includes a second wrap-around lens, and a refractive element disposed at the second region between the wrap-around lens and the second wrap-around lens. In some embodiments, the refractive element includes a corrective lens, or optionally an assembly of corrective lenses. In some embodiments, a corrective lens can be a progressive lens. In some cases, corrective lens can be a trifocal lens. In some embodiments, a wrap-around lens can have or present a cylindrical surface, a spherical surface, or a conical surface. In some instances, a wrap-around lens can at least partially contribute to the second optical power of the second region. In some embodiments, a lens assembly may include a refractive element integral to the wrap-around lens, and the refractive element can at least partially contribute to the second optical power of the second region. In some instances, the second region is at least partially located at a top portion of the wrap-around lens. In some instances, the second region is at least partially located at a bottom portion of the wrap-around lens. In some instances, the second region is defined by a single boundary, the second region providing the second optical power for each eye of the user. In some instances, the wrap-around lens is defined by a single boundary. In some instances, the second region is defined by a single boundary. According to exemplary embodiments, the second region is defined by a first boundary and a second boundary, the first boundary is configured for placement along a visual axis of a right eye of the user, and the second boundary is configured for placement along a visual axis of a left eye of the user. In some exemplary embodiments, the frame is coupled with or integral to a goggle. In some exemplary embodiments, the goggle is a ski goggle. In some exemplary embodiments, the wrap-around lens includes a plastic sheet. In some exemplary embodiments, the first optical power and the second optical power are provided by a plastic sheet. In some instances, the plastic sheet can include a polycarbonate. In some instances, the wrap-around lens can include a sheet of extruded plastic. In some instances, the wrap-around lens can include a sheet of molded plastic.

In another aspect, embodiments of the present invention encompass protective eyewear systems for providing vision enhancement to a user. An exemplary system may include an eyeshield lens assembly for coupling with a helmet. The eyeshield lens assembly may include a first region with a first optical power and a second region with a second optical power different from the first optical power. In some cases, a protective eyewear system can include an attachment mechanism for attaching the eyeshield lens assembly with a body of the helmet. In some cases, the attachment mechanism can be integral to the eyeshield lens assembly. In some cases, the attachment mechanism can be removably coupleable with the eyeshield lens assembly. In some cases, the attachment mechanism can be fixed with the eyeshield lens assembly. In some cases, the protective eyewear system can include a helmet. In some cases, the eyeshield lens assembly is configured for pivotal coupling with the helmet. In some cases, the protective eyewear system includes a helmet, and the eyeshield lens assembly is pivotably coupled with the helmet. In some cases, the eyeshield lens assembly is pivotably coupled with the helmet at two pivot points. In some cases, the eyeshield lens assembly is configured for pivotal coupling with the attachment mechanism. In some cases, the eyeshield lens assembly is pivotally coupled with the attachment mechanism. In some cases, the eyeshield lens assembly is removably coupleable with the attachment mechanism. In some cases, the eyeshield lens assembly is fixed with the attachment mechanism. In some cases, a protective eyewear system includes a helmet. In some cases, an attachment mechanism is removably coupleable with a body of the helmet. In some cases, an attachment mechanism is fixed with a body of the helmet. In some cases, an eyeshield lens assembly is removably coupleable with a body of the helmet. In some cases, an eyeshield lens assembly is fixed with the helmet. In some cases, an eyeshield lens assembly includes a wrap-around eyeshield lens. In some cases, an eyeshield lens assembly includes a refractive element attached with the wrap-around eyeshield lens, and the refractive element at least partially contributing to the second optical power of the second region. In some cases, an eyeshield lens assembly further includes a second wrap-around lens. In some cases, an eyeshield lens assembly further includes a second wrap-around lens, and also includes a refractive element disposed at the second region between the wrap-around lens and the second wrap-around lens. In some cases, the refractive element includes a corrective lens. In some cases, the corrective lens is a progressive lens. In some cases, the corrective lens is a trifocal lens. In some cases, the second optical power is configured to provide enhanced near vision for the user. In some cases, the first optical power is 0 Diopters and the second optical power is 2.25 Diopters. In some cases, the wrap-around eyeshield lens provides or presents a cylindrical surface, a spherical surface, or a conical surface. In some cases, the wrap-around eyeshield lens at least partially contributes to the second optical power of the second region. In some cases, the eyeshield lens assembly includes a refractive element integral to the wrap-around eyeshield lens, the refractive element at least partially contributing to the second optical power of the second region. In some cases, the second region is at least partially located at a top portion of the wrap-around eyeshield lens. In some cases, the second region is at least partially located at a bottom portion of the wrap-around eyeshield lens. In some cases, the second region is defined by a single boundary, the second region providing the second optical power for each eye of the user. In some cases, the wrap-around eyeshield lens is defined by a single boundary. In some cases, the second region is defined by a single boundary. In some cases, the second region is defined by a first boundary and a second boundary, the first boundary is configured for placement along a visual axis of a right eye of the user, and the second boundary is configured for placement along a visual axis of a left eye of the user. In some cases, the wrap-around eyeshield lens includes a plastic sheet. In some cases, the first optical power and the second optical power are provided by the plastic sheet. In some cases, the plastic sheet includes a polycarbonate. In some cases, the wrap-around eyeshield lens includes a sheet of extruded plastic. In some cases, the wrap-around eyeshield lens includes a sheet of molded plastic.

In another aspect, embodiments of the present invention encompass methods of manufacturing a protective eyewear system for providing vision enhancement to a user. Exemplary manufacturing methods may include obtaining a frame, and obtaining a lens assembly having a wrap-around lens. The wrap-around lens may include a first region with a first optical power and a second region with a second optical power different from the first optical power. Methods may further include coupling the wrap-around lens with the frame. In some cases, the second optical power is configured to provide enhanced near vision for the user. In some cases, the first optical power is 0 Diopters and the second optical power is 2.25 Diopters. In some cases, methods include attaching the frame with a headband.

In still a further aspect, embodiments of the present invention encompass methods of manufacturing a wrap-around lens for an protective eyewear system that provides vision enhancement to a user. Exemplary methods may include obtaining an optical material, and processing the optical material to provide the wrap-round lens. The wrap-around lens may have a first region with a first optical power and a second region with a second optical power different from the first optical power. In some embodiments, the optical material includes a plastic material. In some embodiments, the step of processing the optical material includes extruding the optical material. In some embodiments, the step of processing the optical material includes molding the optical material. In some embodiments, methods may include attaching the wrap-around lens with a frame. In some embodiments, methods may include attaching the frame with a headband. In some embodiments, the second optical power is configured to provide enhanced near vision for the user. In some embodiments, the first optical power is 0 Diopters and the second optical power is 2.25 Diopters. In some embodiments, methods may include attaching the wrap-around lens with a helmet. In some embodiments, the wrap-around lens is attached with the helmet via a pivoting connection. In some embodiments, the wrap-around lens is attached with the helmet via a non-pivoting connection.

In yet a further aspect, embodiments of the present invention encompass methods of manufacturing a protective eyewear system for providing vision enhancement to a user. Exemplary methods may include obtaining a helmet, and obtaining an eyeshield lens assembly having a wrap-around eyeshield lens. The wrap around eyeshield lens can have a first region with a first optical power and a second region with a second optical power different from the first optical power. Methods may also include coupling the wrap-around eyeshield lens with the helmet. In some instances, the second optical power is configured to provide enhanced near vision for the user. In some instances, the first optical power is 0 Diopters and the second optical power is 2.25 Diopters. In some instances, the wrap-around eyeshield lens is coupled with the helmet via a pivoting connection. In some instances, the wrap-around eyeshield lens is coupled with the helmet via a non-pivoting connection.

In another aspect, embodiments of the present invention encompass bifocal or multifocal goggles for vision correction. A bifocal or multifocal goggle may include a frame, and a lens assembly. The lens assembly may include a wrap-around lens encircled by the frame, and a corrective lens attached to the wrap-around lens. In some cases, a goggle may include second wrap-around lens. In some cases, a goggle may include a second wrap-around lens, and a corrective lens is located between the wrap-around lens and the second wrap-around lens. In some cases, the wrap-around lens can be cylindrical or spherical. In some cases, a corrective lens is a progressive lens. In some instances, the corrective lens is a trifocal lens. In some instances, the wrap-around lens has vision correction. In some instances, the corrective lens is formed integral to the wrap-around lens. In some instances, the corrective lens is located at a top of the wrap-around lens.

The above described and many other features and attendant advantages of embodiments of the present invention will become apparent and further understood by reference to the following detailed description when considered in conjunction with the accompanying drawings.

BRIEF DESCRIPTION OF THE DRAWINGS

FIG. 3I illustrates aspects of a protective eyewear system according to embodiments of the present invention.

FIG. 3J illustrates aspects of a protective eyewear system according to embodiments of the present invention.

FIG. 7B illustrates aspects of a method of manufacturing a warp-around lens according to embodiments of the present invention.

FIG. 7C illustrates aspects of a method of manufacturing a protective eyewear system according to embodiments of the present invention.

DETAILED DESCRIPTION OF THE INVENTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It being understood that various changes may be made in the function and arrangement of elements without departing from the spirit and scope as set forth in the appended claims.

Figure 1A:
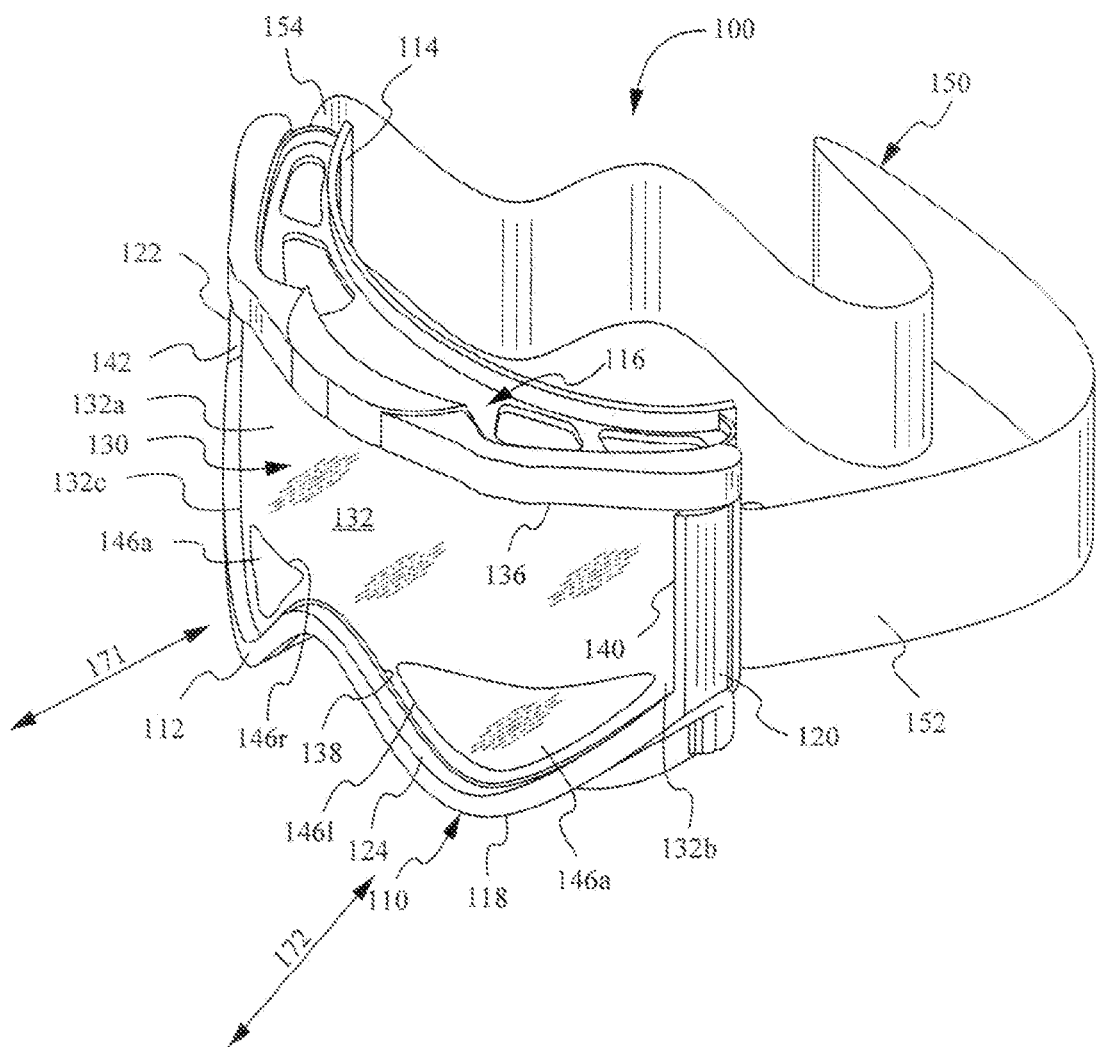
FIG. 1A illustrates aspects of a protective eyewear system according to embodiments of the present invention.

Referring initially to FIG. 1A, an isometric perspective of bifocal goggles 100 of an embodiment is shown. This embodiment places two corrective lenses 146 at the bottom of a lens assembly 130. Wearers of goggles increasingly suffer from presbyopia as the demographic for sports ages. The bifocal goggles 100 have corrective lenses 146 of selectable magnification to correct vision for close viewing. The corrective lenses 146 could have differing amounts of magnification from top to bottom to create trifocals or even progressive lenses. The bifocal goggle 100 is intended for use in winter sports, motorcycling, military, police, and safety applications, and the like.

The goggle frame 110 holds a lens assembly 130. The frame 110 can be made of any of a variety of materials such as thermoplastic polyurethane and is commonly made of a material that has a low durometer so it can conform to the user's face. The frame 110 is provided with a frame front surface 112 and an oppositely disposed frame back surface 114. The frame 110 is also provided with a frame top 116, a frame bottom 118 a frame left side 120 and a frame right side 122. The frame top 116, frame bottom 118 frame left side 120 and frame right side 122 have thickness thereby causing the frame front surface 112 to be offset from the frame back surface 114.

The frame 110 may be provided with a foam (not shown) attached to the back surface 114 for improving the fit when interfaced with the face of the wearer. In one exemplary configuration, the frame 110 is provided with a channel 124 extends around a perimeter defined by the top 116, the bottom 118, the left side 120 and the right side 122. This channel 124 is capable of receiving the lens 130 and holding the lens 130 relative to the frame 110.

The lens assembly 130 has one, two or three wrap-around lenses in addition to the corrective lens(es) 146. The lens assembly 130 is provided with a front wrap-around lens 132 and an oppositely disposed wrap-around back lens in this embodiment. The wrap-around lenses are defined at their perimeter by a lens assembly top 136, a lens assembly bottom 138, a lens assembly left side 140 and a lens assembly right side 142. A void is formed between the front wrap-around lens 132 and the back wrap-around lens. Each wrap-around lens of the lens assembly 130 may have multiple layers to provide color, scratch resistance, sunblock, polarization, and the like. Each wrap-around lens 130 is made of a material that is relatively translucent (e.g. polycarbonate).

The corrective lens 146 can be attached to the wrap-around lens 132 in any number of ways. In one embodiment, the corrective lens 146 is heat welded or glued to the wrap-around lens 132. Some embodiments form the wrap-around lens 132 with the corrective lens 146 integral using, for example, an extrusion process. The corrective lens 146 can be inside or outside the bifocal goggle 100.

The bifocal goggles 100 have an adjustable strap 150 with a right distal end 154 and left distal end 152 to friction fit the bifocal goggles 100 to a wearer's head. The right distal end 154 is adjustably attached to a frame right side 122 and the left distal end 152 is adjustably attached to a left frame side 120. The frame top 116 of the bifocal goggle 100 has venting holes that may have a foam screen in the venting holes to prevent incursion of snow or other debris.

According to some embodiments, a protective eyewear system 100 for providing vision enhancement to a user may include a frame 110 and a lens assembly 130 having a wrap-around lens 132. The wrap-around lens 132 can be coupled with the frame 110, and can have a first region 146a with a first optical power and a second region 132a with a second optical power different from the first optical power. In some cases, the lens assembly 130 may include a refractive element 146 attached with the wrap-around lens 132. The refractive element 146 may at least partially contribute to the second optical power of the second region. In some cases, the second optical power is configured to provide enhanced near vision for the user. In some cases, the first optical power is 0 Diopters and the second optical power is 2.25 Diopters. For example, the first region may provide no correction or enhancement for visual acuity. Accordingly, in some cases the wrap-around lens 132 may present a plano lens configuration at the first region. In some cases, the first region may provide a single power, and may be configured as a monofocal lens. As shown here, the wrap-around lens 132 may be at least partially encircled by the frame 110. As further described elsewhere herein, in some embodiments the lens assembly 130 includes a second wrap-around lens in addition to lens 132. Relatedly, in some embodiments the lens assembly 130 includes a second wrap-around lens, and a refractive element 146 disposed at the second region 146a between the wrap-around lens 132 and the second wrap-around lens. In some cases, the refractive element 146 comprises a corrective lens. Optionally, the corrective lens may include a monofocal lens with one optical power, a bi-focal lens with two optical powers, a tri-focal lens with three optical powers, a multi-focal lens with multiple optical powers, a progressive lens such as a progressive power lens or graduated prescription lens, or an aspheric lens. According to some embodiments, the wrap-around lens may include or present a cylindrical surface, a spherical surface, or a conical surface. In some cases, an optical power of the wrap-around lens may at least partially contribute to the second optical power of the second region 146a. Relatedly, and as described elsewhere herein, the lens assembly 130 may include a refractive element 146 integral to the wrap-around lens 132, and the refractive element 146 may at least partially contribute to the second optical power of the second region 146a.

As depicted in FIG. 1A, the second region 146a may be at least partially located at a bottom portion 132b of the wrap-around lens 132. In some instances, the second region 146a can be defined by a single boundary, and the second region can provide the second optical power for each eye of the user. As shown here, the wrap-around lens 132 can be defined by a single boundary 132c, and the second region can be defined by a first boundary 146r and a second boundary 146l. The first boundary 146r is configured for placement along a visual axis 171 of a right eye of the user, and the second boundary 146l is configured for placement along a visual axis 172 of a left eye of the user. In some instances, the frame 110 is coupled with or integral to a goggle system, such as a snow skiing or sports goggle system. In some instances, the wrap-around lens 132 includes a plastic sheet. Optionally, the first optical power and the second optical power can be provided by the plastic sheet. In some cases, the plastic sheet includes a polycarbonate. Relatedly, the wrap-around lens 132 may include a sheet of extruded plastic. In some cases, the wrap-around lens 132 includes a sheet of molded plastic. As discussed elsewhere herein, lens assemblies may include one or more wrap-around lenses. In some cases, a lens assembly may include multiple wrap-around lenses, where each of the lenses includes one or more optical materials such as polycarbonate, acetate, or the like. In some cases, a lens assembly may include a foam gasket between adjacent wrap-around lenses.

Figure 1B:
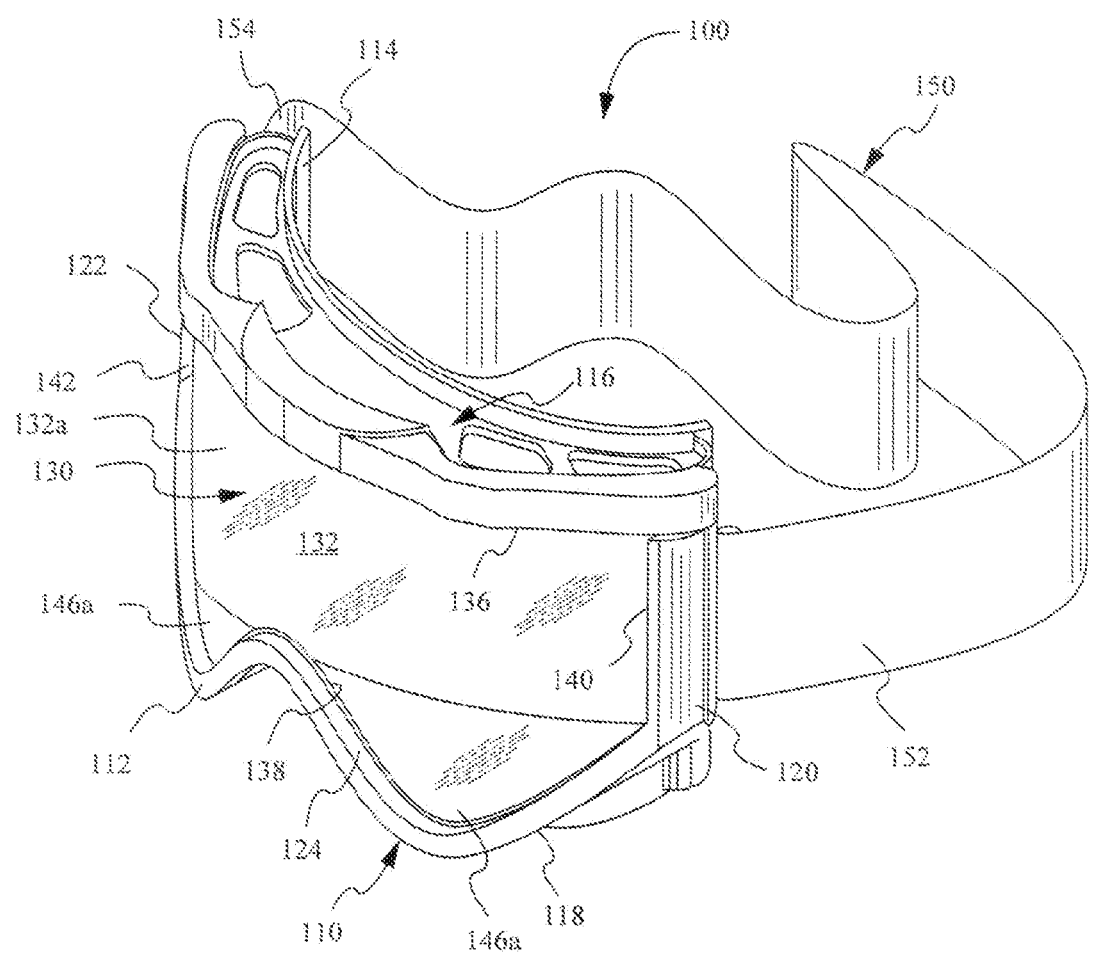
FIG. 1B illustrates aspects of a protective eyewear system according to embodiments of the present invention.

With reference to FIG. 1B, an isometric perspective of bifocal goggles 100 of another embodiment is shown. This embodiment places a corrective lens 146 at the lens assembly bottom 138. The corrective lens 146 is formed along a horizontal strip that is edged to fit within the frame 110. The blank wrap-around lens 132 could have the corrective lens 146 formed integrally. The lens assembly 130 is stamp cut from a cylindrical or spherical blank. According to some embodiments, a protective eyewear system 100 for providing vision enhancement to a user may include a frame 110 and a lens assembly 130 having a wrap-around lens 132. The wrap-around lens 132 can be coupled with the frame 110, and can have a first region 146a with a first optical power and a second region 132a with a second optical power different from the first optical power.

Figure 1C:
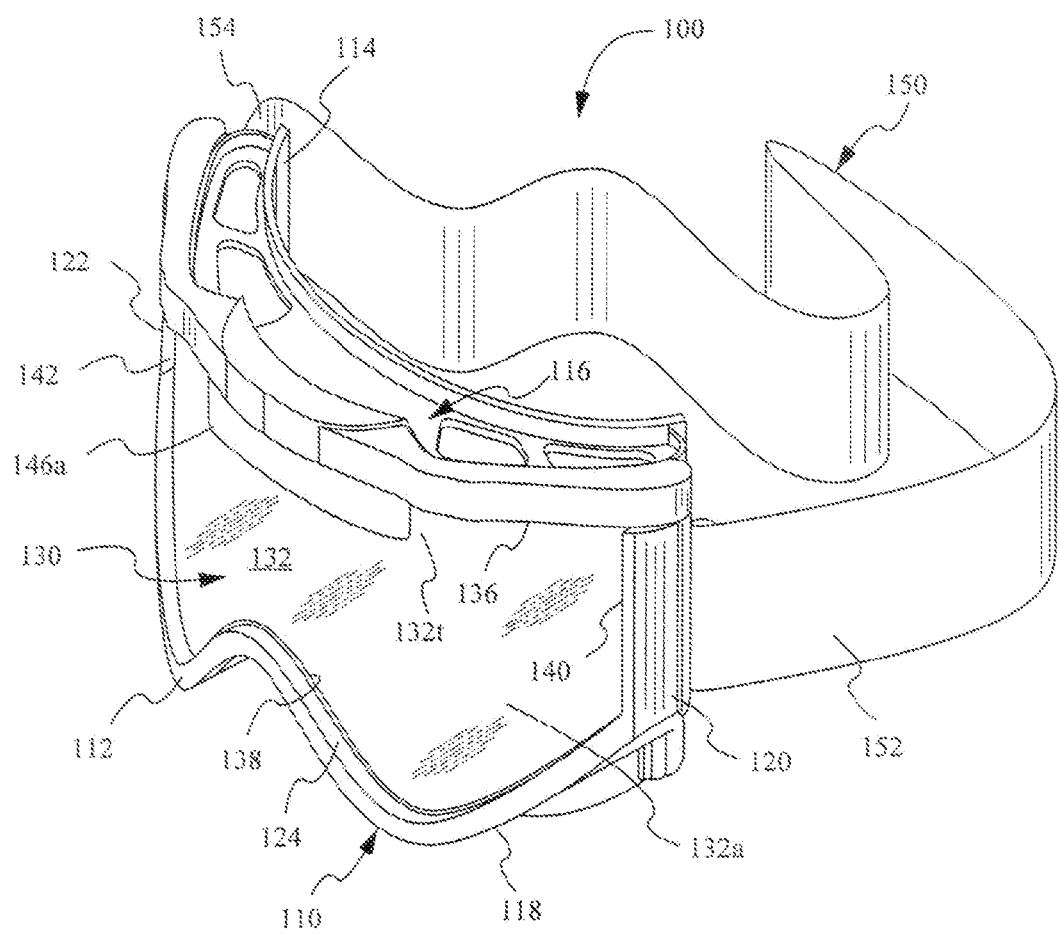
FIG. 1C illustrates aspects of a protective eyewear system according to embodiments of the present invention.

Referring next to FIG. 1C, an isometric perspective of bifocal goggles 100 of yet another embodiment is shown. This embodiment places a single corrective lens 146 at the lens assembly top 136. The wearer tilts down their head to have their vision use the corrective lenses 146 to correct their vision for close objects. The location of the corrective lens overlaps the optical center of both eyes. Although this embodiment has a single corrective lens 146, other embodiments could have a split to have two separate corrective lenses above the optical path of the eyes. According to some embodiments, a protective eyewear system 100 for providing vision enhancement to a user may include a frame 110 and a lens assembly 130 having a wrap-around lens 132. The wrap-around lens 132 can be coupled with the frame 110, and can have a first region 146a with a first optical power and a second region 132a with a second optical power different from the first optical power. As shown here, a protective eyewear system 100 can include a second region 146a at least partially located at a top portion 132t of the wrap-around lens 132.

Figure 1D:
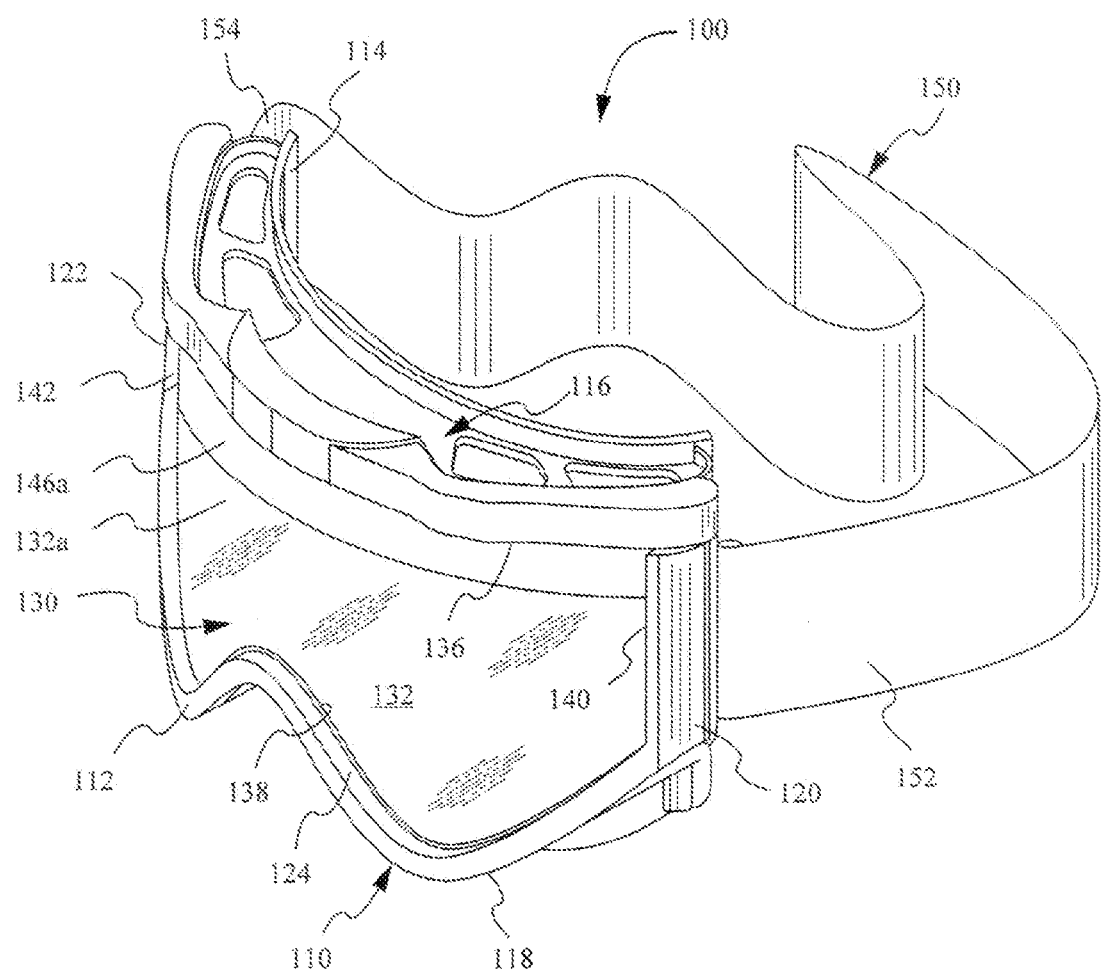
FIG. 1D illustrates aspects of a protective eyewear system according to embodiments of the present invention.

With reference to FIG. 1D, an isometric perspective of bifocal goggles 100 of still another embodiment is shown. This embodiment places a corrective lens 146 at the lens assembly top 136. The corrective lens 146 is formed along a horizontal strip that is edged to fit within the frame 110. The blank wrap-around lens 132 could have the corrective lens 146 formed integrally. The lens assembly 130 is stamp cut from a cylindrical or spherical blank. According to some embodiments, a protective eyewear system 100 for providing vision enhancement to a user may include a frame 110 and a lens assembly 130 having a wrap-around lens 132. The wrap-around lens 132 can be coupled with the frame 110, and can have a first region 146a with a first optical power and a second region 132a with a second optical power different from the first optical power.

Figure 1E:
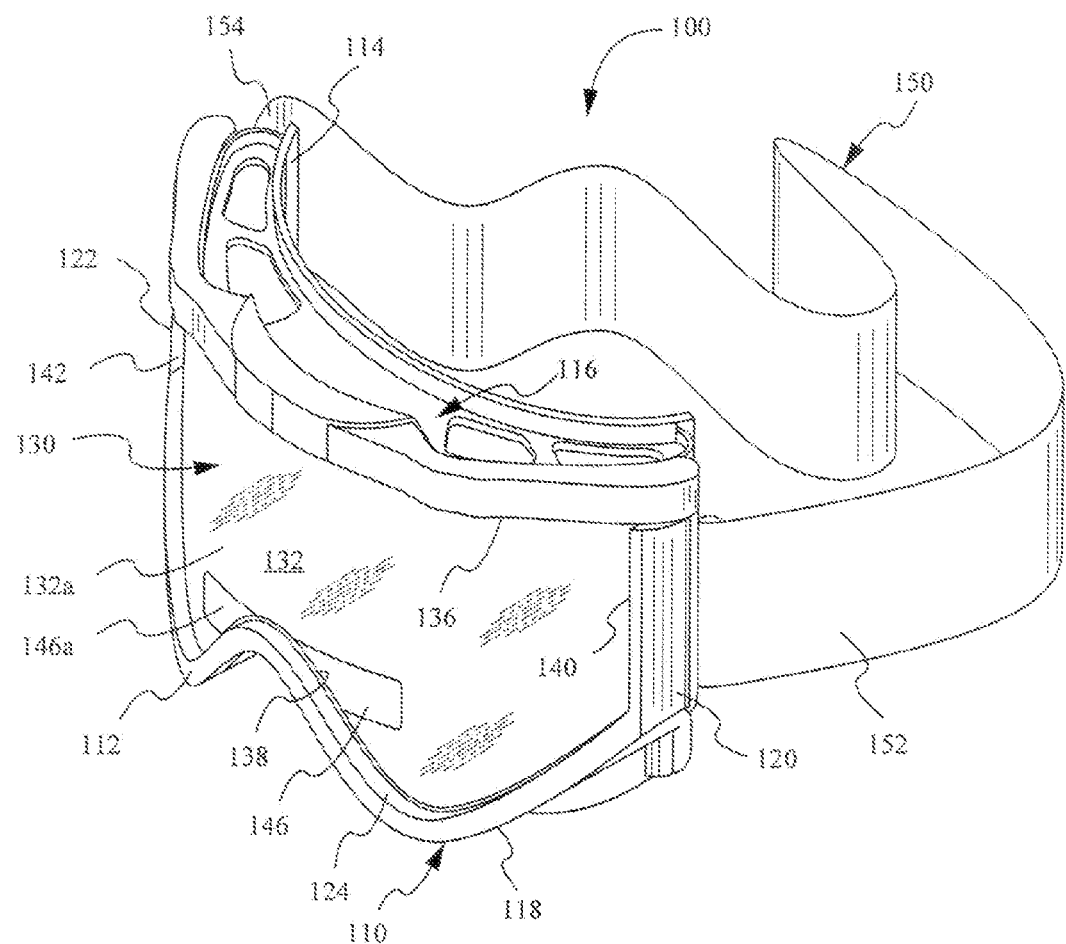
FIG. 1E illustrates aspects of a protective eyewear system according to embodiments of the present invention.

With reference to FIG. 1E, an isometric perspective of bifocal goggles 100 of another embodiment is shown. This embodiment places the corrective lenses 146 below the optical center of the eyes of the wearer. Depending on the width of the goggle 100, the corrective lenses 146 can be placed in different locations so that they are each 146 respectively close to the optical center of the eyes. According to some embodiments, a protective eyewear system 100 for providing vision enhancement to a user may include a frame 110 and a lens assembly 130 having a wrap-around lens 132. The wrap-around lens 132 can be coupled with the frame 110, and can have a first region 146a with a first optical power and a second region 132a with a second optical power different from the first optical power.

Figure 2A:
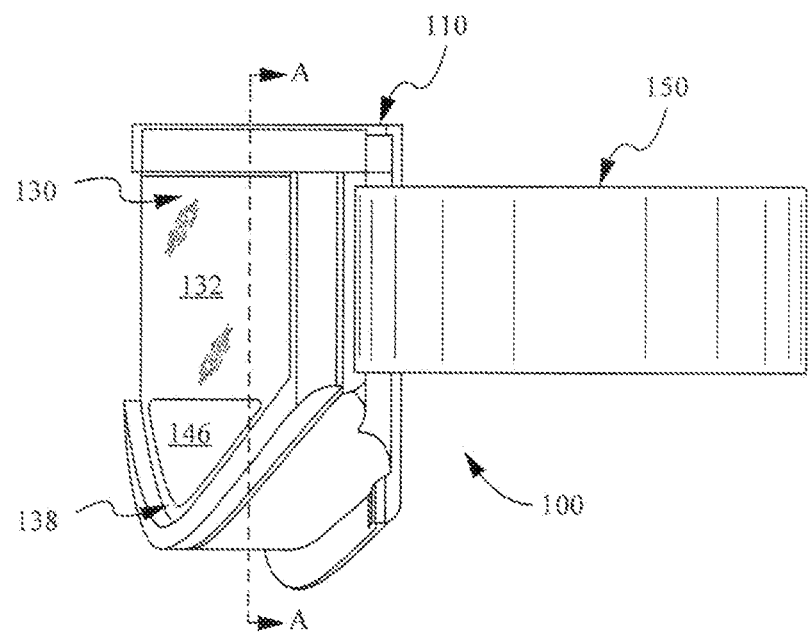
FIG. 2A illustrates aspects of a protective eyewear system according to embodiments of the present invention.

Referring next to FIG. 2A, a side elevation view of the bifocal goggles 100 of an embodiment is shown. This embodiment corresponds to the embodiment of FIG. 1A. The corrective lens 146 is attached near the lens assembly bottom 138.

Figure 2B:
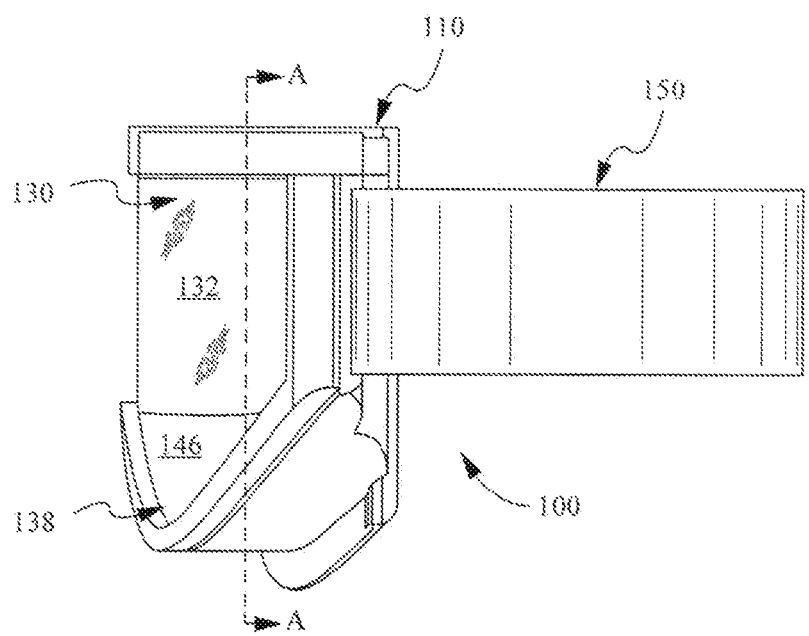
FIG. 2B illustrates aspects of a protective eyewear system according to embodiments of the present invention.

With reference to FIG. 2B, a side elevation view of the bifocal goggles 100 of another embodiment is shown. This embodiment corresponds to the embodiment of FIG. 1B. The corrective lens 146 is attached near the lens assembly bottom 138 as a horizontal strip.

Figure 2C:
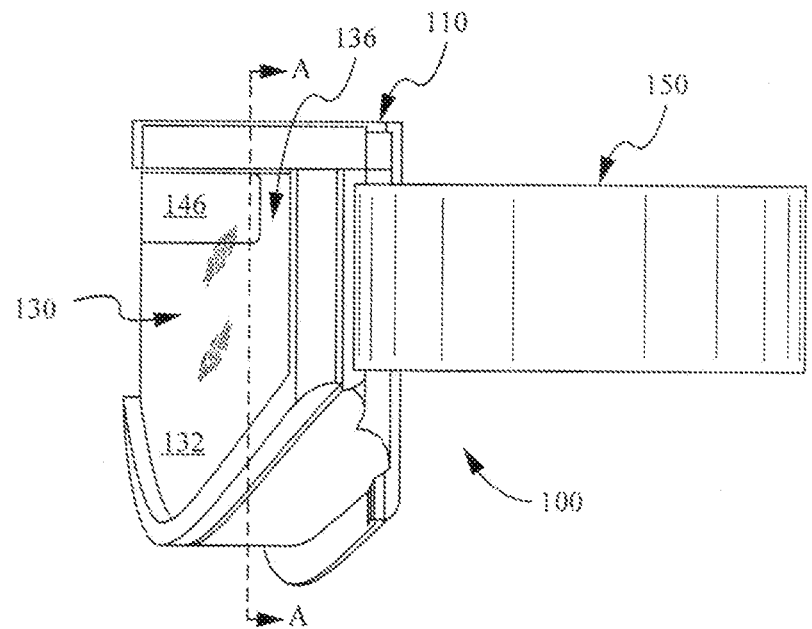
FIG. 2C illustrates aspects of a protective eyewear system according to embodiments of the present invention.

Referring next to FIG. 2C, a side elevation view of the bifocal goggles 100 of yet another embodiment is shown. This embodiment corresponds to the embodiment of FIG. 1C. The corrective lens 146 is attached near the lens assembly top 136.

Figure 2D:
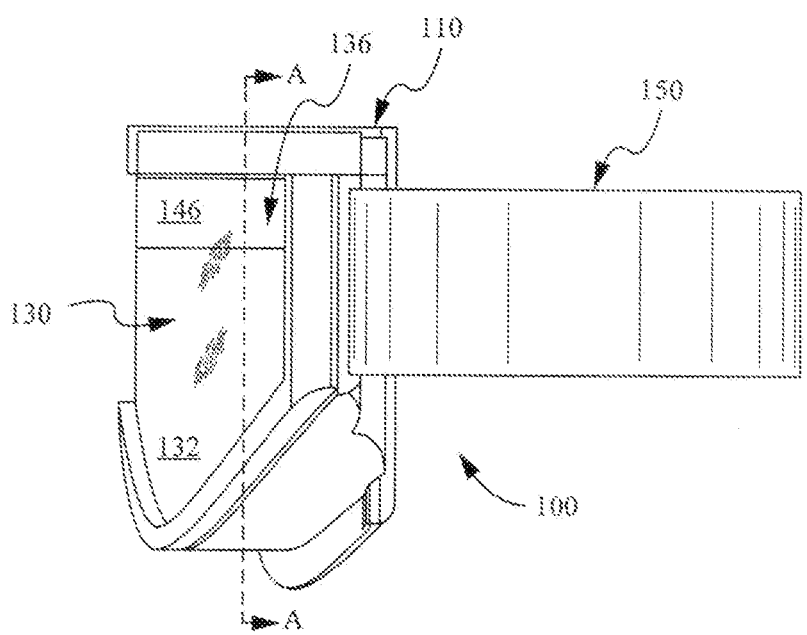
FIG. 2D illustrates aspects of a protective eyewear system according to embodiments of the present invention.

With reference to FIG. 2D, a side elevation view of the bifocal goggles 100 of still another embodiment is shown. This embodiment corresponds to the embodiment of FIG. 1D. The corrective lens 146 is attached near the lens assembly top 136 as a horizontal strip.

Figure 2E:
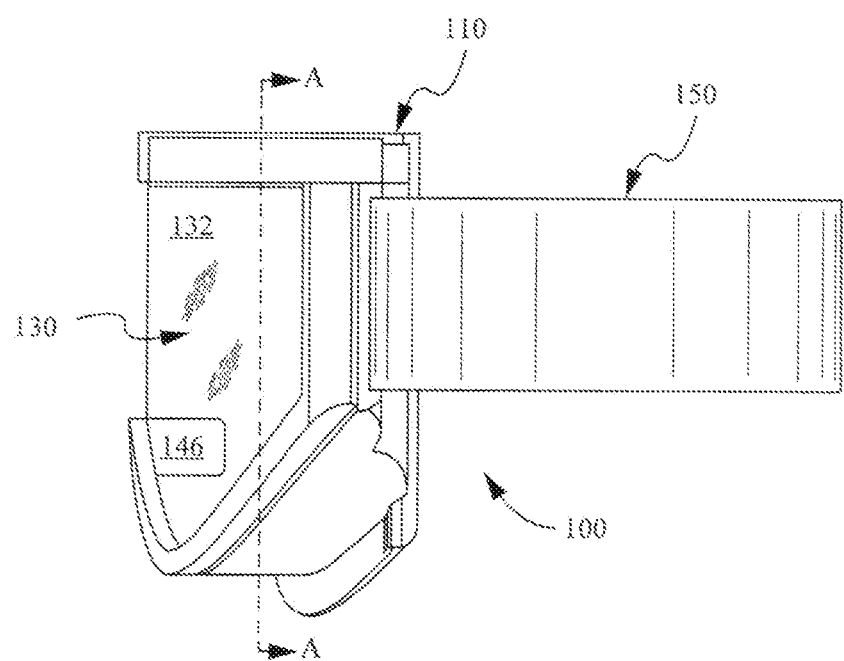
FIG. 2E illustrates aspects of a protective eyewear system according to embodiments of the present invention.

With reference to FIG. 2E, a side elevation view of the bifocal goggles 100 of another embodiment is shown. This embodiment corresponds to the embodiment of FIG. 1E. The corrective lenses 146 are attached on opposing sides of the lens assembly nose bridge.

Figure 3B:
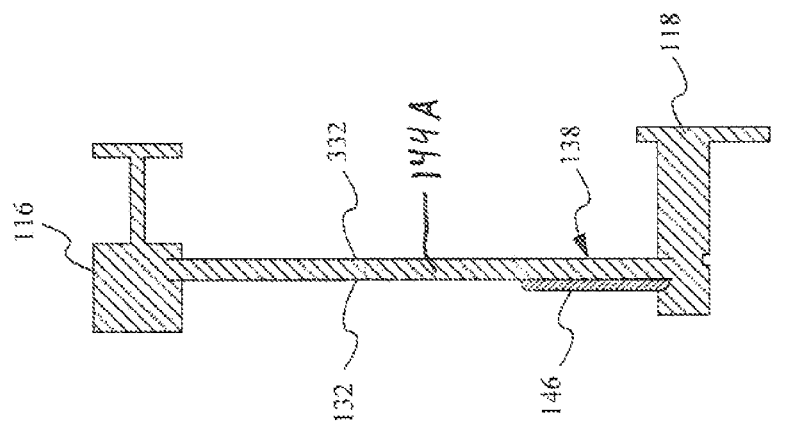
FIG. 3B illustrates aspects of a protective eyewear system according to embodiments of the present invention.
Figure 3A:
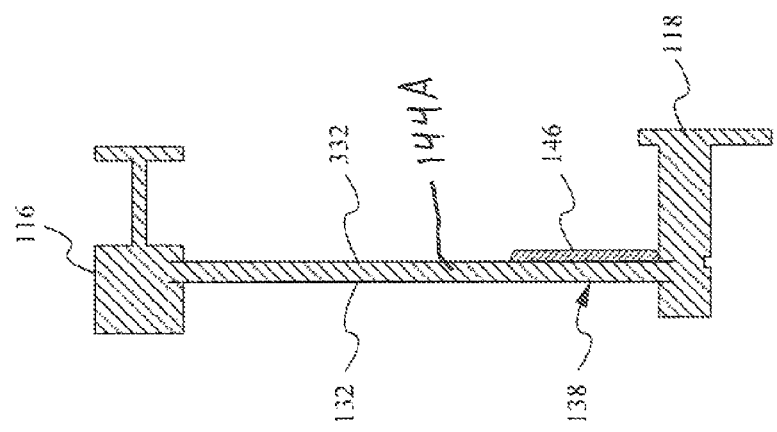
FIG. 3A illustrates aspects of a protective eyewear system according to embodiments of the present invention.

Referring next to FIG. 3A, a side-sectional view of an embodiment of the bifocal goggles 100 along a line A-A' shown in FIG. 2A or 2B. This embodiment uses two wrap-around lenses 132, 332 with an air gap 144A between them. The corrective lens 146 is attached near the lens assembly bottom 138 on the inside of the bifocal goggle 100.

With reference to FIG. 3B, a side-sectional view of an embodiment of the bifocal goggles 100 along a line A-A' shown in FIG. 2A or 2B. This embodiment uses two wrap-around lenses 132, 332 with an air gap 144A between them. The corrective lens 146 is attached near the lens assembly bottom 138 on the outside of the bifocal goggle 100.

Figure 3D:
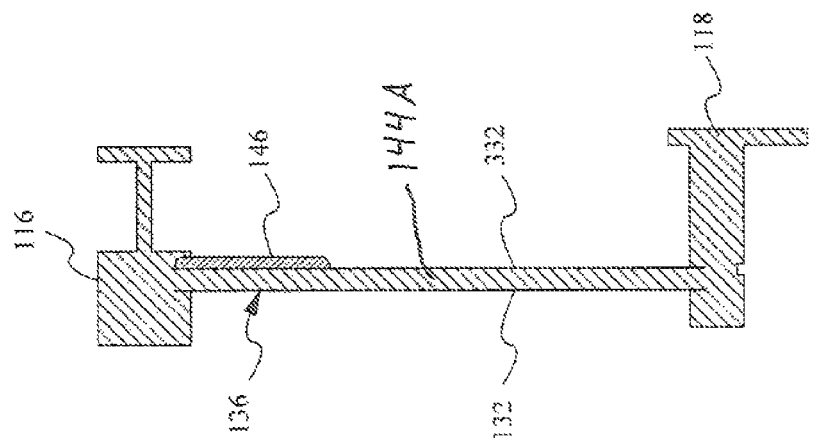
FIG. 3D illustrates aspects of a protective eyewear system according to embodiments of the present invention.
Figure 3C:
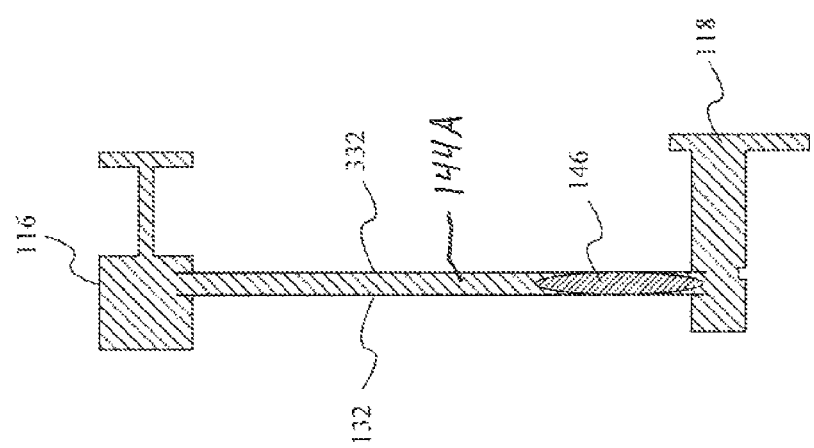
FIG. 3C illustrates aspects of a protective eyewear system according to embodiments of the present invention.

Referring next to FIG. 3C, a side-sectional view of an embodiment of the bifocal goggles 100 along a line A-A' shown in FIG. 2A or 2B. This embodiment uses two wrap-around lenses 132, 332 with an air gap 144A between them. The corrective lens 146 is located near the lens assembly bottom 138 between the two wrap-around lenses 132, 332 of the bifocal goggle 100. The corrective lens 146 could be attached or integral to either of the wrap-around lenses 132, 332 or separate altogether.

With reference to FIG. 3D, a side-sectional view of another embodiment of the bifocal goggles 100 along a line A-A' shown in FIG. 2C or 2D. This embodiment uses two wrap-around lenses 132, 332 with an air gap 144A between them. The corrective lens 146 is attached near the lens assembly top 136 on the inside of the bifocal goggle 100.

Figure 3F:
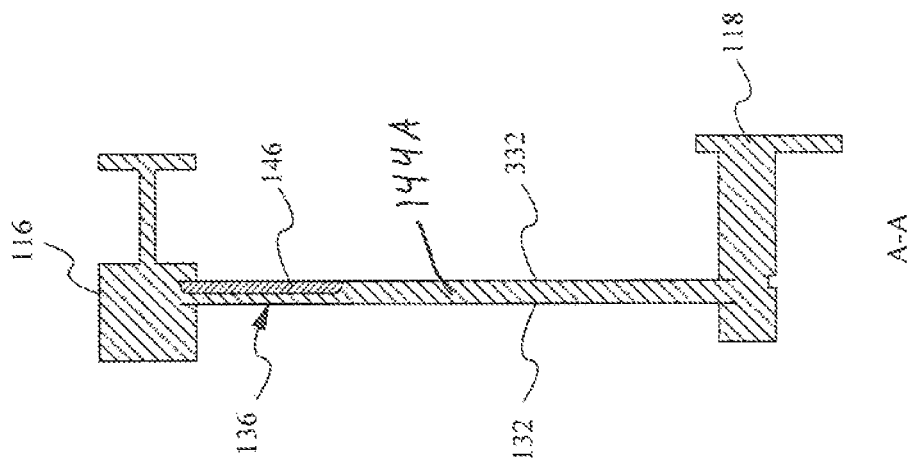
FIG. 3F illustrates aspects of a protective eyewear system according to embodiments of the present invention.
Figure 3E:
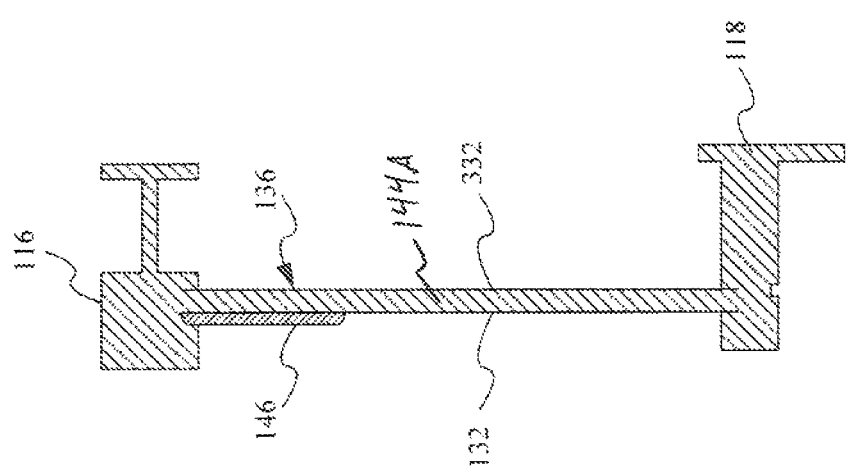
FIG. 3E illustrates aspects of a protective eyewear system according to embodiments of the present invention.

Referring next to FIG. 3E, a side-sectional view of another embodiment of the bifocal goggles 100 along a line A-A' shown in FIG. 2C or 2D. This embodiment uses two wrap-around lenses 132, 332 with an air gap 144A between them. The corrective lens 146 is attached near the lens assembly top 136 on the outside of the bifocal goggle 100.

With reference to FIG. 3F, a side-sectional view of another embodiment of the bifocal goggles 100 along a line A-A' shown in FIG. 2C or 2D. This embodiment uses two wrap-around lenses 132, 332 with an air gap 144A between them. The corrective lens 146 is attached near the lens assembly top 136 in the air gap 144A of the bifocal goggle 100. In this embodiment, the corrective lens 146 is integral to the inside wrap-around lens 332, but could be integral to the other wrap-around lens 132 or separate from both in other embodiments.

Figure 3H:
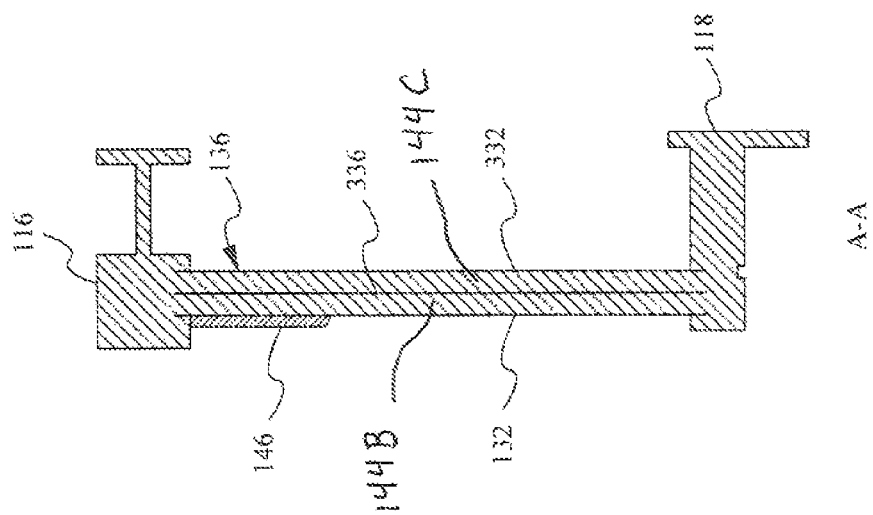
FIG. 3H illustrates aspects of a protective eyewear system according to embodiments of the present invention.
Figure 3G:
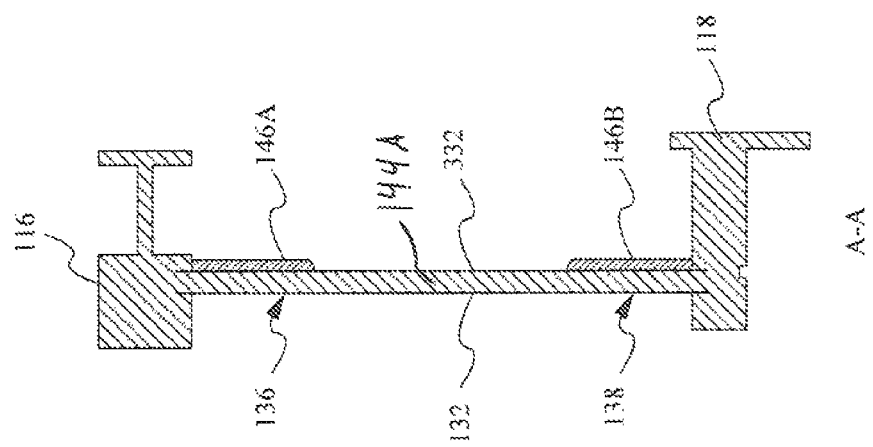
FIG. 3G illustrates aspects of a protective eyewear system according to embodiments of the present invention.

Referring next to FIG. 3G, a side-sectional view of an embodiment of the bifocal goggles 100 along a line A-A'. This embodiment uses two wrap-around lenses 132, 332 with an air gap 144A between them. This embodiment has two corrective lenses 146A, 146B, which are respectively attached near the lens assembly top 136 and lens assembly bottom 138 on the inside of the bifocal goggle 100. Other embodiments could variously place the two corrective lenses 146A, 146 outside of the bifocal goggle 100 or in the air gap between the two wrap-around lenses 132, 332.

With reference to FIG. 3H, a side-sectional view of an embodiment of the bifocal goggles 100 along a line A-A'. This embodiment uses three wrap-around lenses 132, 336, 332 with two air gaps 144B and 144C interspersed between them. The corrective lens 146 is attached near the lens assembly top 136 on the outside of the bifocal goggle 100.

With reference to FIG. 3I, a side-sectional view of another embodiment of the bifocal goggles 100 along a line A-A'. This embodiment uses three wrap-around lenses 132, 336, 332 with two air gaps 144B and 144C interspersed between them. The corrective lens 146 is attached near the lens assembly bottom 138 in the inside air gap 144C between the middle wrap-around lens 336 and the inside wrap-around lens 332.

With reference to FIG. 3J, a side-sectional view of yet another embodiment of the bifocal goggles 100 along a line A-A'. This embodiment uses three wrap-around lenses 132, 336, 332 with two air gaps 144B and 144C interspersed between them. The corrective lens 146 is attached near the lens assembly top 136 in the outside air gap 144B between the middle wrap-around lens 336 and the outside wrap-around lens 132.

Figure 3K:
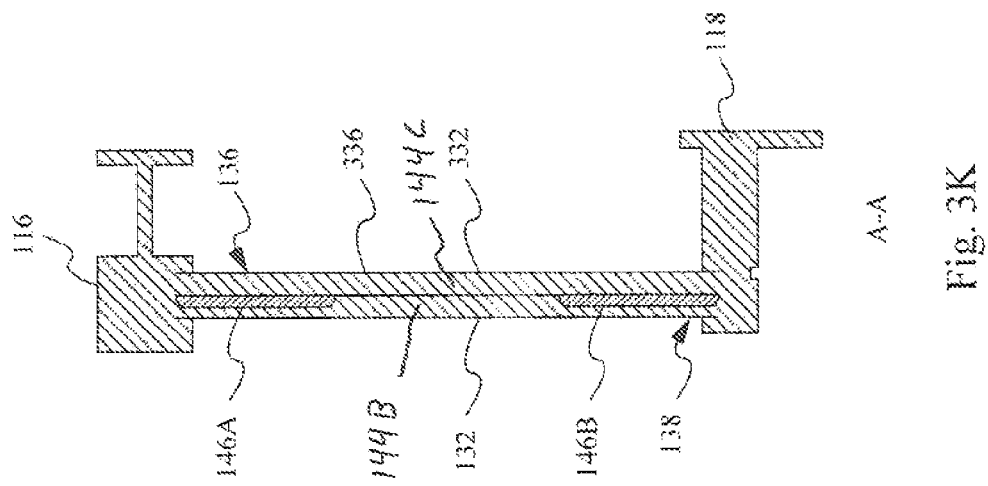
FIG. 3K illustrates aspects of a protective eyewear system according to embodiments of the present invention.

With reference to FIG. 3K, a side-sectional view of still another embodiment of the bifocal goggles 100 along a line A-A'. This embodiment uses three wrap-around lenses 132, 336, 332 with two air gaps 144B and 144C interspersed between them. The two corrective lenses 146A, 146B are respectively attached near the lens assembly top 136 and the lens assembly bottom 138. The corrective lenses 146A, 146B are located between the outside air gap 144B, but could be placed on any surface of the three lenses 132, 336, 332 or even could be separate altogether in various embodiments.

Figure 4A:
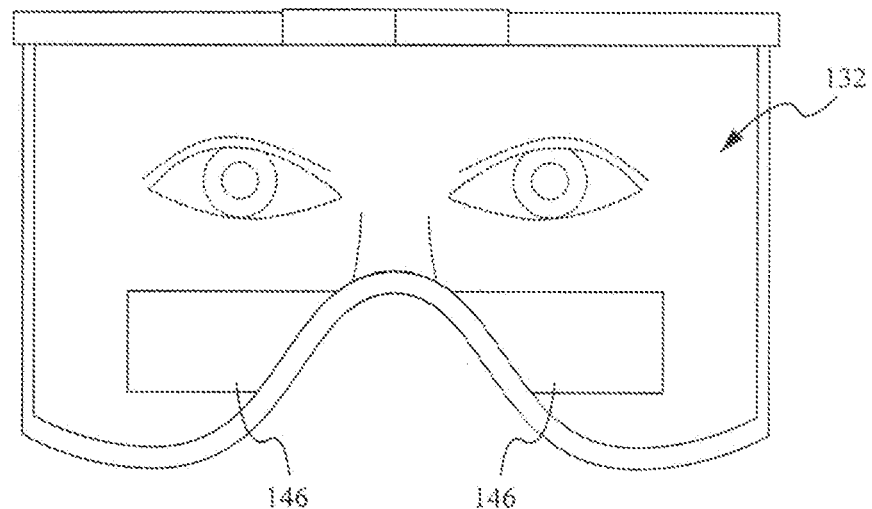
FIG. 4A illustrates aspects of a protective eyewear system according to embodiments of the present invention.

Referring next to FIG. 4A, a plan view of an embodiment of a wrap-around lens 132 after being stamped or edged into shape. The wrap-around lens 132 has corrective lenses 146 installed below the optical paths of the eyes. Installation could be before or after being stamped or edged into shape. Additional wrap-around lenses could be added after they are also stamped or edged.

Figure 4B:
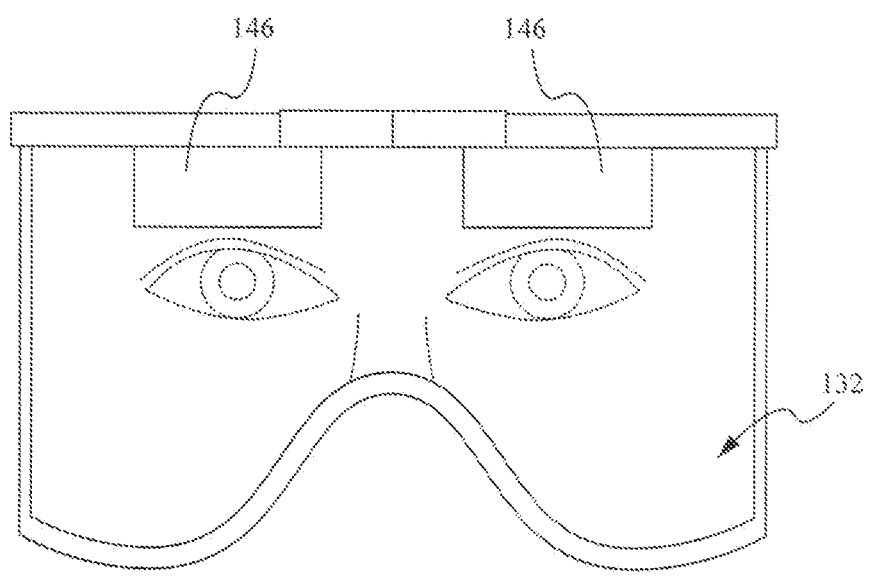
FIG. 4B illustrates aspects of a protective eyewear system according to embodiments of the present invention.

With reference to FIG. 4B, a plan view of another embodiment of a wrap-around lens 132 after being stamped or edged into shape. The wrap-around lens 132 has corrective lenses 146 installed above the optical paths of the eyes. Installation could be before or after being stamped or edged into shape. Additional wrap-around lenses could be added after they are also stamped or edged. The embodiments of FIG. 4A and FIG. 4B could use the same blank lens, achieving the desired shape by rotating the blank lens prior to stamping or edging.

Figure 4C:
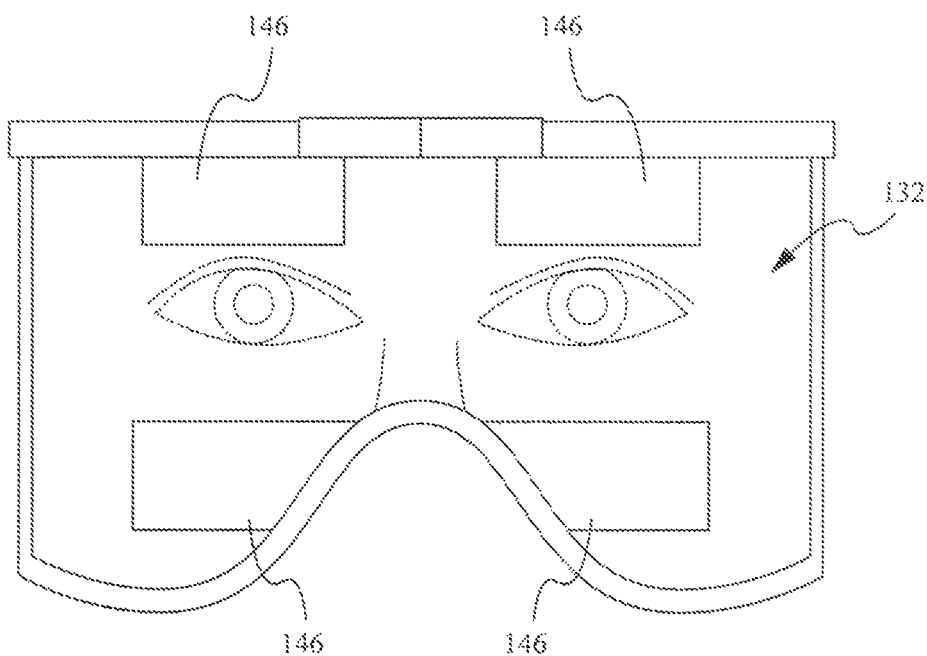
FIG. 4C illustrates aspects of a protective eyewear system according to embodiments of the present invention.

Referring next to FIG. 4C, a plan view of still another embodiment of a wrap-around lens 132 after being stamped or edged into shape. The wrap-around lens 132 has corrective lenses 146 installed both above and below the optical paths of the eyes. Installation could be before or after being stamped or edged into shape. The above and below configuration could be achieved with a single wrap-around lens 132 or separate wrap-around lenses that each have two of the four corrective lenses 146.

Figure 5A:
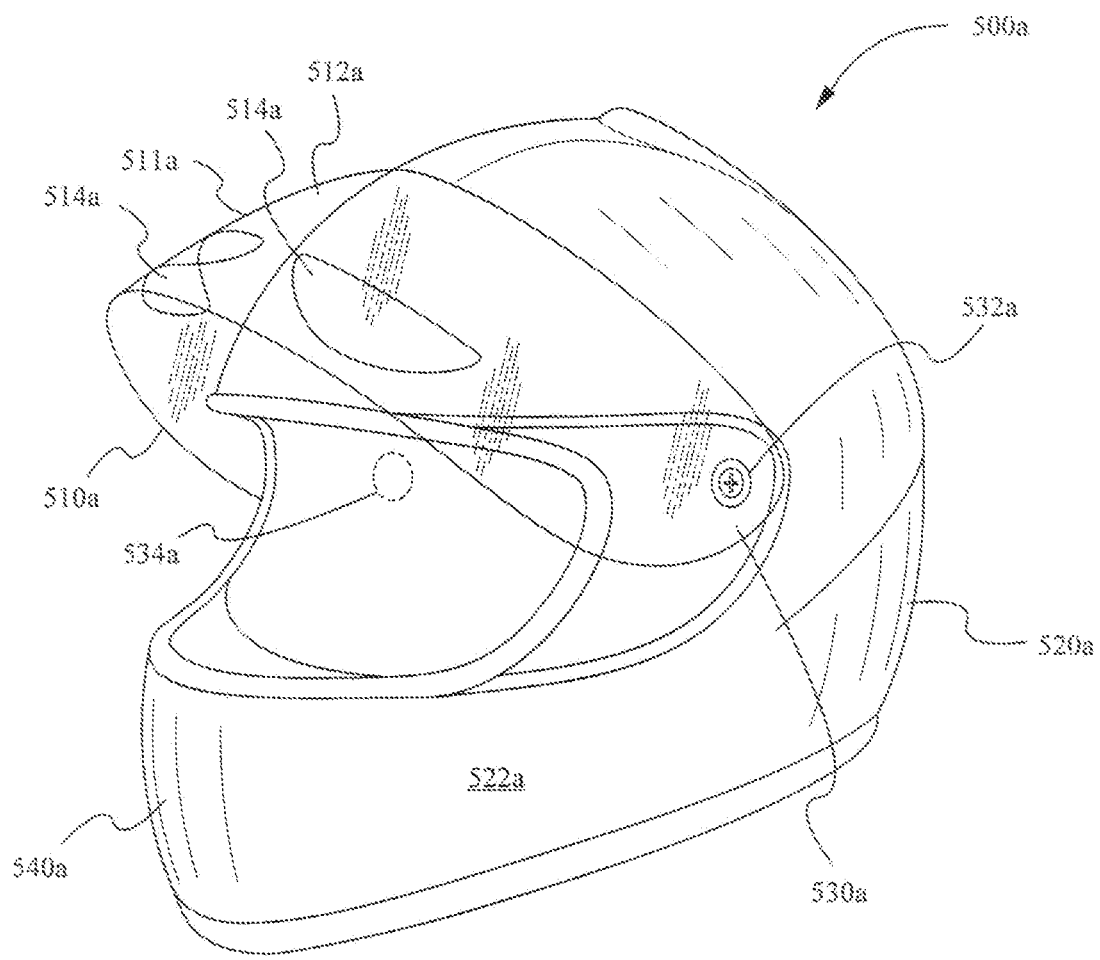
FIG. 5A illustrates aspects of a protective eyewear system according to embodiments of the present invention.

In addition to vision enhancement goggle systems and methods as disclosed elsewhere herein, the instant disclosure also includes multifocal optical element for helmets and other headgear devices. For example, FIG. 5A illustrates a protective eyewear system 500a for providing vision enhancement to a user, according to embodiments of the present invention. As shown here, the eyewear system 500a includes an eyeshield lens assembly 510a for coupling with a helmet 520a. The eyeshield lens assembly 510a includes a first region 512a with a first optical power and a second region 514a with a second optical power different from the first optical power. Second region 514a may include two distinct sections, as shown here, or a single section, as described elsewhere herein, for example with reference to FIG. 5B. In some instances, first region 512a and second region 514a are at least partially provided by a wrap-around lens or eyeshield lens 511a of assembly 510a. As depicted here, eyewear system 500a may also include an attachment mechanism 530a for attaching the eyeshield lens assembly 510a with a body 522a of the helmet 520a. Attachment mechanisms may include features independent from, or optionally integral with, either or both of the lens assembly 510a and helmet 520a or helmet body 522a. For example, attachment mechanism 530a may include features or structures such as those described in U.S. Pat. No. 5,095,551, U.S. Pat. No. 5,177,817, U.S. Pat. No. 6,711,753, or U.S. Pat. No. 7,376,981 the contents of which are incorporated herein by reference. In some instances, the attachment mechanism 530a can be removably coupleable with the eyeshield lens assembly 510a. In some instances, the attachment mechanism 530a is fixed with the eyeshield lens assembly 510a. In some instances, the eyeshield lens assembly 510a is configured for pivotal coupling with helmet 520a. Optionally, the protective eyewear system 500a may include helmet 520a. As shown here, the eyeshield lens assembly 510a can be pivotably coupled with the helmet 520a at two pivot points or mechanisms 532a, 534a. According to some embodiments, a helmet may be provided as a full-face configuration, and include a chin bar or other protective guard 540a for covering a user's chin.

Figure 5B:
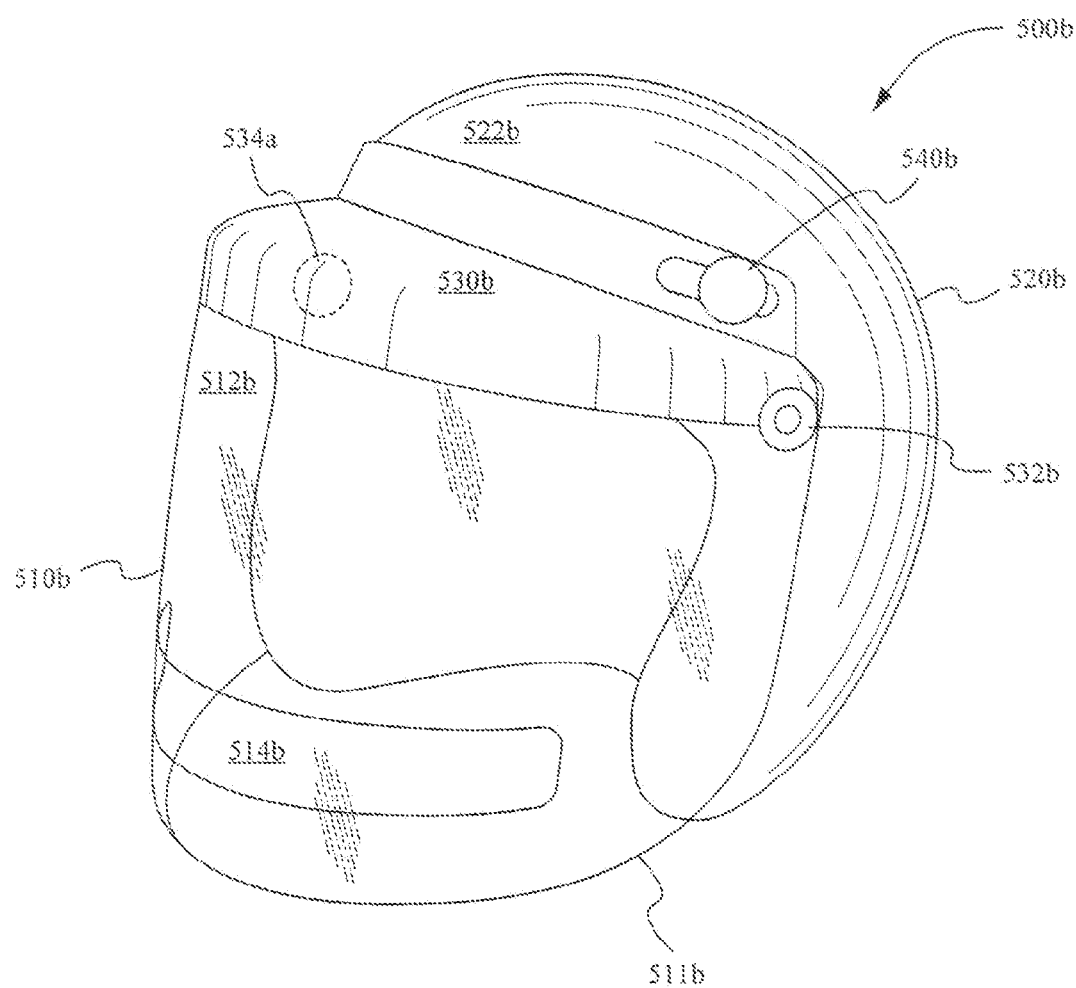
FIG. 5B illustrates aspects of a protective eyewear system according to embodiments of the present invention.

FIG. 5B illustrates a protective eyewear system 500b for providing vision enhancement to a user, according to embodiments of the present invention. As shown here, the eyewear system 500b includes an eyeshield lens assembly 510b for coupling with a helmet 520b. The eyeshield lens assembly 510b includes a first region 512b with a first optical power and a second region 514b with a second optical power different from the first optical power. In some instances, first region 512b and second region 514b are at least partially provided by a wrap-around lens or eyeshield lens 511b of assembly 510b. As depicted here, eyewear system 500b may also include an attachment mechanism 530b for attaching the eyeshield lens assembly 510b with a body 522b of the helmet 520b. Attachment mechanisms may include features independent from, or optionally integral with, either or both of the lens assembly 510b and helmet 520b or helmet body 522b. In some instances, the attachment mechanism 530b can be removably coupleable with the eyeshield lens assembly 510b. In some instances, the attachment mechanism 530b may be removably coupleable with the helmet 520b. For example, the attachment mechanism 530b and helmet 520b may be coupleable via one or more snap mechanisms 540b. Optionally, snap mechanism 540b may include a cap snap assembly, an open ring snap assembly, a socket snap assembly, a stud snap assembly, or the like. In some instances, the attachment mechanism 530b is fixed with the eyeshield lens assembly 510b. In some instances, the eyeshield lens assembly 510b is configured for pivotal coupling with helmet 520b. Optionally, the protective eyewear system 500b may include helmet 520b. As shown here, the eyeshield lens assembly 510b can be pivotably coupled with the attachment mechanism 530b at two pivot points 532b, 534b. In some instances, lens assembly 510b can be coupled to attachment mechanism 530b via a rivet mechanism, a snap assembly, or the like. As shown here, the eyeshield lens assembly 510b can be pivotably coupled with the helmet 520b via attachment mechanism 530b. Hence, the eyeshield lens assembly can be configured for pivotal coupling with the attachment mechanism, and the eyeshield lens assembly can be pivotably coupled with the attachment mechanism. According to some embodiments, a helmet may be provided as an open-face configuration, having no chin bar or other protective guard for covering a user's chin.

Figure 5C:
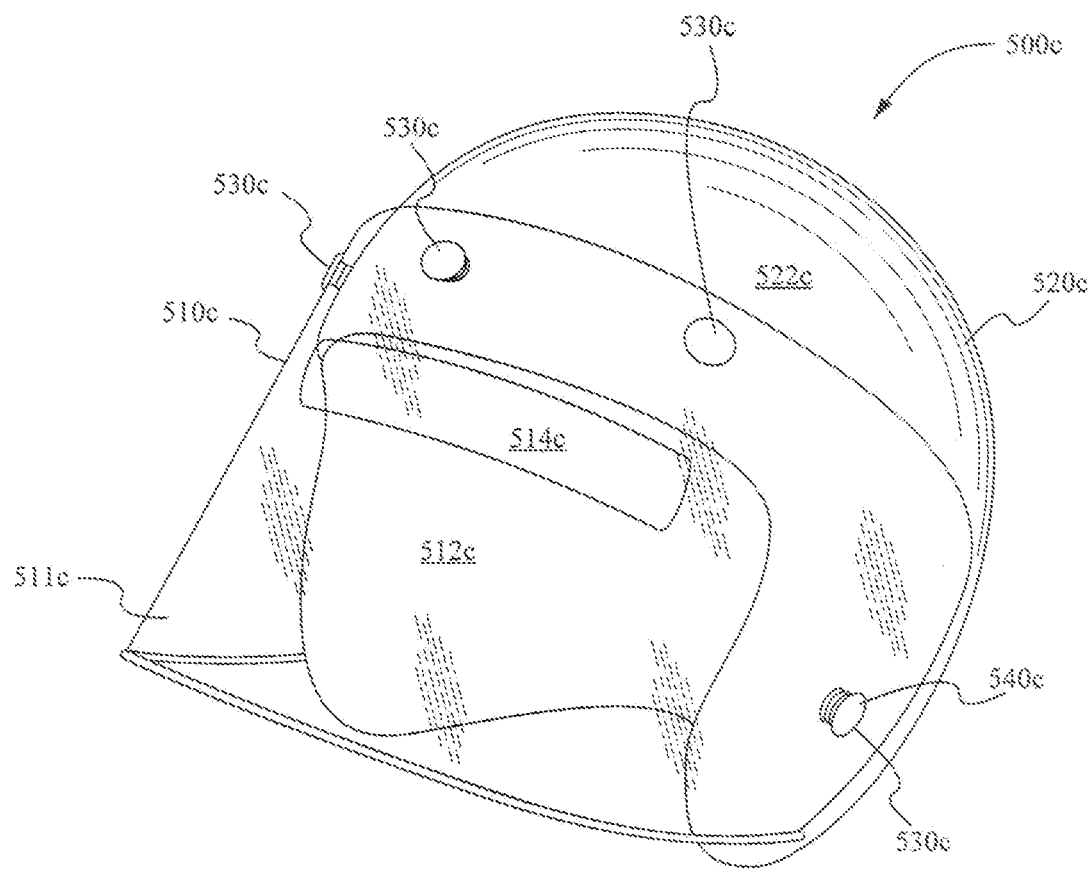
FIG. 5C illustrates aspects of a protective eyewear system according to embodiments of the present invention.

FIG. 5C illustrates a protective eyewear system 500c for providing vision enhancement to a user, according to embodiments of the present invention. As shown here, the eyewear system 500c includes an eyeshield lens assembly 510c for coupling with a helmet 520c. The eyeshield lens assembly 510c includes a first region 512c with a first optical power and a second region 514c with a second optical power different from the first optical power. In some instances, first region 512c and second region 514c are at least partially provided by a wrap-around lens or eyeshield lens 511c of assembly 510c. As depicted here, eyewear system 500c may also include an attachment mechanism 530c for attaching the eyeshield lens assembly 510c with a body 522c of the helmet 520c. For example, attachment mechanism 530c may include one or more snaps, fasteners, rivets, or the like. Attachment mechanisms may include features independent from, or optionally integral with, either or both of the lens assembly 510c and helmet 520c or helmet body 522c. In some instances, the attachment mechanism 530c can be removably coupleable with the eyeshield lens assembly 510c. In some instances, the attachment mechanism 530c may be removably coupleable with the helmet 520c. For example, the attachment mechanism may include a snap mechanism 540c. Optionally, snap mechanism 540c may include a cap snap assembly, an open ring snap assembly, a socket snap assembly, a stud snap assembly, or the like. In some instances, the attachment mechanism 530c, eyeshield lens assembly 510c, or both, are fixed with the helmet 520b. Optionally, the protective eyewear system 500c may include helmet 520c. In some instances, lens assembly 510c can be coupled to attachment mechanism 530c or helmet 520c via a rivet mechanism, a snap assembly, or the like. In some cases, the eyeshield lens assembly 510c is fixed with the helmet 520b or helmet body 522b.

Figure 6A:
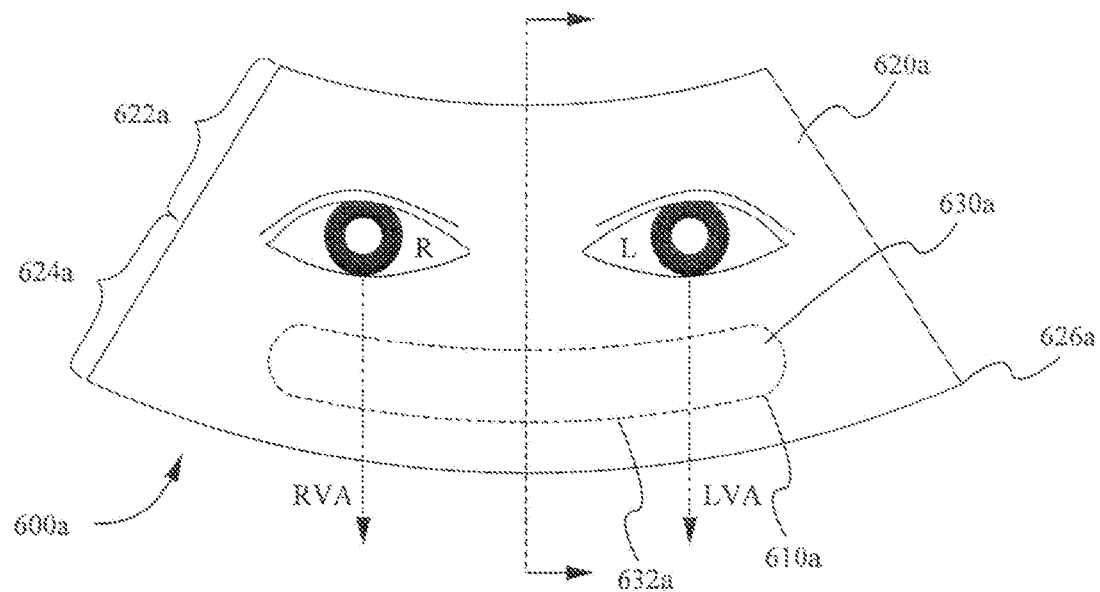
FIG. 6A illustrates aspects of a protective eyewear system according to embodiments of the present invention.
Figure 6B:
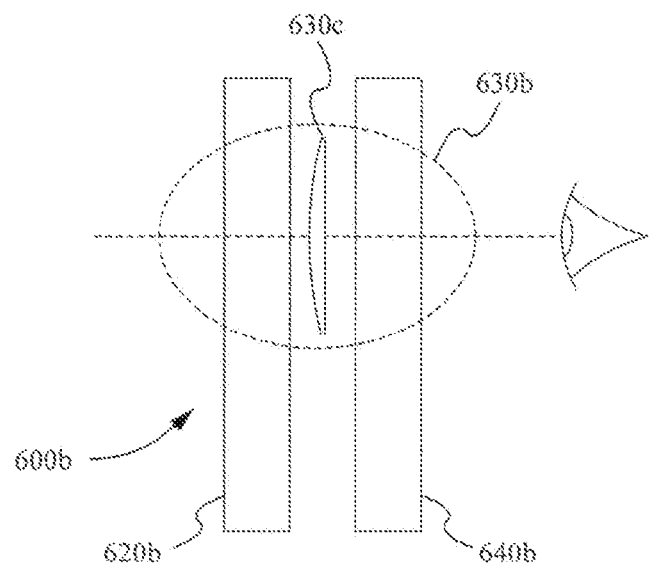
FIG. 6B illustrates aspects of a protective eyewear system according to embodiments of the present invention.

As depicted in FIG. 6A, an in related embodiments such as those encompassed by any of FIG. 5A, 5B, or 5C, an eyeshield lens assembly 600a can include a refractive element 610a attached with a wrap-around eyeshield lens 620a, and the refractive element can at least partially contribute to the second optical power of the second region 630a. In some cases, as depicted in FIG. 6B, an eyeshield lens assembly 600b includes a first wrap-around eyeshield 620b and a second warp-around eyeshield lens 640b. A refractive element, which may at least partially contribute to a second optical power of a second region 630b, may be disposed between eyeshield lenses 620b and 640b, or at least partially within or integral to either or both of eyeshield lenses 620b and 640b. In some instances, the refractive element 630c includes a corrective or vision enhancement lens. For example, a refractive element 630c can provide a power of about 2.25 diopters, which is similar to the optical power provided by many standard reading glasses. In some cases, the optical power provided by refractive element 630c is within a range from 0 diopters to 4 diopters. Optionally, the optical power may be provided at any desired or needed value within such a range. For example, the optical power may be provided in intervals of 0.25 diopters (0 D, 0.25 D, 0.50 D, . . . ), 0.10 diopters (0 D, 0.1 D, 0.2 D, 0.3 D, . . . ), and the like. In some instances, the difference between the first region optical power and the second region optical power is 2.25 diopters (e.g. first optical power is 0.1 D and second optical power is 2.35 D). In some instances, the difference between the first region optical power and the second region optical power is within a range from 0 to 4.0 diopters.

According to some embodiments, the corrective lens is a progressive lens. In some cases, the corrective lens may be a monofocal lens, a bifocal lens, a trifocal lens, or any other multifocal lens. In some instances, the second optical power is configured to provide enhanced near vision for the user. In some instances, a wrap-around eyeshield lens includes a cylindrical surface, a spherical surface, or a conical surface. In some instances, a wrap-around eyeshield lens at least partially contributes to the second optical power of the second region. In some instances, an eyeshield lens assembly 600b includes a refractive element integral to a wrap-around eyeshield lens, and the refractive element at least partially contributes to the second optical power of the second region. As shown in FIG. 6A, the second region 630a can be at least partially located at a top portion 622a of the wrap-around eyeshield lens 620a. Relatedly, the second region 630a can be at least partially located at a bottom portion 624a of the wrap-around eyeshield lens 620a. In some instances, the second region 630a is defined by a single boundary 632a, the second region providing the second optical power for each eye of the user (e.g. right eye R and left eye L). The wrap-around eyeshield lens 620a can be defined by a single boundary 626a, which encompasses single boundary 632a of second region 630a. As shown here, the second region can be configured for placement along both a visual axis of a right eye RVA and a visual axis of a left eye LVA of the user. In some instances, a wrap-around eyeshield lens 620a includes a plastic sheet. Relatedly, the first optical power and the second optical power can be provided by the plastic sheet. In some instances, the plastic sheet includes a polycarbonate. In some instances, wrap-around eyeshield lens 620a includes a sheet of extruded plastic. In some instances, a wrap-around eyeshield lens 620a includes a sheet of molded plastic.

Figure 7A:
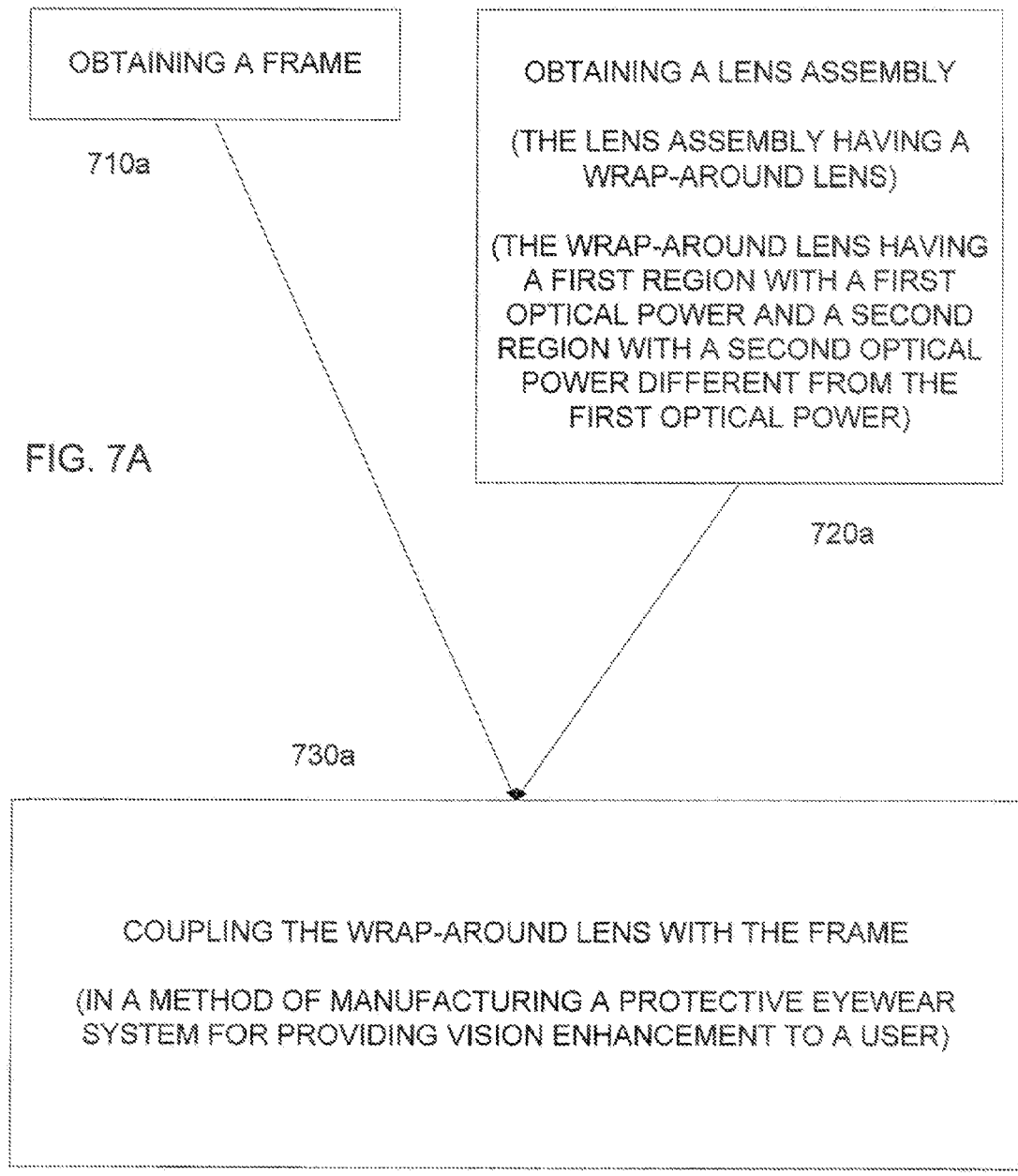
FIG. 7A illustrates aspects of a method of manufacturing a protective eyewear system according to embodiments of the present invention.

FIG. 7A illustrates aspects of methods for manufacturing a protective eyewear system for providing vision enhancement to a user, according to embodiments of the present invention. As depicted here, method 700a includes the step 710a of obtaining a frame and the step 720a of obtaining a lens assembly. An exemplary lens assembly includes a wrap-around lens. An exemplary wrap-around lens includes a first region with a first optical power and a second region with a second optical power different from the first optical power. The method also includes the step 730a of coupling the wrap-around lens with the frame. In some instances, the second optical power is configured to provide enhanced near vision for the user. In some instances, the first optical power is 0 Diopters and the second optical power is 2.25 Diopters. In some instances, methods may further include attaching the frame with a headband, a helmet, or another headgear device that can be worn on or about the user's head.

FIG. 7B illustrates aspects of methods for manufacturing a wrap-around lens for an protective eyewear system that provides vision enhancement to a user, according to embodiments of the present invention. As depicted here, method 700b includes the step 710b of obtaining an optical material, and the step 720b of processing the optical material to provide the wrap-round lens. The wrap-around lens includes a first region with a first optical power and a second region with a second optical power different from the first optical power. According to some embodiments, the optical material comprises a plastic material. Step 720b of processing the optical material may include extruding the optical material. Relatedly, step 720b of processing the optical material may include molding the optical material. In some cases, methods may include attaching the wrap-around lens with a frame. In some cases, methods may include attaching the frame with a headband. The second optical power can be configured to provide enhanced near vision for the user. In some cases, the first optical power is 0 Diopters and the second optical power is 2.25 Diopters. In some cases, methods may include attaching the wrap-around lens with a helmet. Optionally, methods may include attaching the wrap-around lens with the helmet via a pivoting connection or mechanism. Relatedly, methods may include attaching the wrap-around lens with the helmet via a non-pivoting connection or mechanism.

FIG. 7C illustrates aspects of methods for manufacturing a protective eyewear system for providing vision enhancement to a user, according to embodiments of the present invention. As depicted here, method 700c includes the step 710c of obtaining a helmet, and the step 720c of obtaining an eyeshield lens assembly. The eyeshield lens assembly includes a wrap-around eyeshield lens, and the wrap around eyeshield lens includes a first region with a first optical power and a second region with a second optical power different from the first optical power. Method 700c also includes the step 730c of coupling the wrap-around eyeshield lens with the helmet. Often, the second optical power is configured to provide enhanced near vision for the user. In some cases, the first optical power is 0 Diopters and the second optical power is 2.25 Diopters. In some cases, the wrap-around eyeshield lens is coupled with the helmet via a pivoting connection or mechanism. In some cases, the wrap-around eyeshield lens is coupled with the helmet via a non-pivoting connection or mechanism.

It is understood that embodiments of the present invention encompass similar methods for manufacturing any of the eyewear devices, systems, assemblies, mechanisms, or apparatuses disclosed herein. Similarly, it is understood that embodiments of the present invention encompass any eyewear devices, systems, assemblies, mechanisms, or apparatuses produced by the manufacturing methods disclosed herein.

While the principles of the disclosure have been described above in connection with specific apparatuses and methods, it is to be clearly understood that this description is made only by way of example and not as limitation on the scope of the disclosure.

What is claimed is:

1. A protective eyewear system for providing vision enhancement to a user, the system comprising:
    a frame; and
    a lens assembly comprising a wrap-around lens, the wrap-around lens coupled with the frame, the wrap-around lens having a first region with a first optical power and a second region with a second optical power different from the first optical power,
    wherein the lens assembly further comprises a refractive element integral to the wrap-around lens, the refractive element at least partially contributing to the second optical power of the second region.

2. The protective eyewear system according to claim 1, wherein the wrap-around lens is at least partially encircled by the frame.

3. The protective eyewear system according to claim 1, wherein the lens assembly further comprises a second wrap-around lens, and a second refractive element disposed at the second region between the wrap-around lens and the second wrap-around lens.

4. The protective eyewear system according to claim 1, wherein the wrap-around lens is defined by a single boundary.

5. The protective eyewear system according to claim 4, wherein the second region is defined by a first boundary and a second boundary, the first boundary configured for placement along a visual axis of a right eye of the user, and the second boundary configured for placement along a visual axis of a left eye of the user.

6. The protective eyewear system according to claim 1, wherein the frame is coupled with or integral to a goggle.

7. The protective eyewear system according to claim 1, wherein the second region is defined by a single boundary, and wherein a location of the second region overlaps an optical center of both of the user's eyes.

8. A protective eyewear system for providing vision enhancement to a user, the system comprising:
    an eyeshield lens assembly for coupling with a helmet, the eyeshield lens assembly having a first region with a first optical power and a second region with a second optical power different from the first optical power, wherein a location of the second region overlaps an optical center of both of the user's eyes.

9. The protective eyewear system according to claim 8, further comprising an attachment mechanism for attaching the eyeshield lens assembly with a body of the helmet.

10. The protective eyewear system according to claim 9, wherein the attachment mechanism is integral to the eyeshield lens assembly.

11. The protective eyewear system according to claim 9, wherein the attachment mechanism is removably coupleable with the eyeshield lens assembly.

12. The protective eyewear system according to claim 9, wherein the attachment mechanism is fixed with the eyeshield lens assembly.

13. The protective eyewear system according to claim 8, further comprising the helmet.

14. A bifocal goggle for vision correction, the bifocal goggle comprising:
    a frame;
    a lens assembly, comprising:
        a first wrap-around lens encircled by the frame,
        a second wrap-around lens; and
        a corrective lens disposed between the first wrap-around lens and the second wrap-around lens,
    wherein the corrective lens is integral to one of the first wrap-around lens and the second wrap-around lens.

15. The bifocal goggle for vision correction recited in claim 14, wherein the wrap-around lens is cylindrical or spherical.

16. The bifocal goggle for vision correction recited in claim 14, wherein the corrective lens is located at a top of the wrap-around lens.

* * * * *